United States Patent
Zong et al.

(10) Patent No.: US 10,901,294 B2
(45) Date of Patent: Jan. 26, 2021

(54) WAVELENGTH SELECTIVE SWITCH, ALIGNMENT DIRECTION OBTAINING METHOD, AND LIQUID CRYSTAL ON SILICON AND METHOD FOR MANUFACTURING SAME

(71) Applicant: HUAWEI TECHNOLOGIES CO., LTD., Shenzhen (CN)

(72) Inventors: Liangjia Zong, Dongguan (CN); Lei Mao, Dongguan (CN); Mi Wang, Shenzhen (CN); Han Zhao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/826,548

(22) Filed: Mar. 23, 2020

(65) Prior Publication Data

US 2020/0225418 A1  Jul. 16, 2020

Related U.S. Application Data

(63) Continuation of application No. PCT/CN2017/103538, filed on Sep. 26, 2017.

(51) Int. Cl.
 *G02F 1/31* (2006.01)
 *G02B 6/35* (2006.01)
 *G02F 1/1337* (2006.01)

(52) U.S. Cl.
 CPC ............. *G02F 1/31* (2013.01); *G02B 6/3512* (2013.01); *G02F 1/1337* (2013.01); *G02F 2203/12* (2013.01)

(58) Field of Classification Search
 CPC ........ G02F 1/31; G02F 2203/12; G02F 1/133; G02B 6/3512
 See application file for complete search history.

(56) References Cited

U.S. PATENT DOCUMENTS

| | | | |
|---|---|---|---|
| 6,567,143 | B1 | 5/2003 | Vanderploeg et al. |
| 7,457,547 | B2 | 11/2008 | Frisken et al. |
| 9,046,657 | B2 | 6/2015 | Stewart et al. |
| 2003/0030881 | A1 | 2/2003 | Xia et al. |
| 2011/0280573 | A1 | 11/2011 | Collings et al. |
| 2013/0194537 | A1 | 8/2013 | Mao et al. |
| 2014/0104560 | A1 | 4/2014 | Suh |
| 2014/0355985 | A1 | 12/2014 | Chu et al. |

(Continued)

FOREIGN PATENT DOCUMENTS

| | | |
|---|---|---|
| CN | 1725068 A | 1/2006 |
| CN | 101888280 A | 11/2010 |

(Continued)

*Primary Examiner* — Phu Vu
(74) *Attorney, Agent, or Firm* — Maier & Maier, PLLC

(57) ABSTRACT

A liquid crystal on silicon, a wavelength selective switch, an alignment direction obtaining method, and a method for manufacturing a liquid crystal on silicon. The liquid crystal on silicon has a first pixel area, and a first liquid crystal located in the first pixel area. The first liquid crystal is deflected in a plane perpendicular to a first panel, and is deflected towards a first direction in a plane parallel to the first panel. An alignment direction of the first partial alignment film located in the first pixel area is deflected towards a second direction relative to a polarization direction of an incident beam, and the second direction is opposite to the first direction to reduce a loss of a deflected beam.

19 Claims, 11 Drawing Sheets

(56) References Cited

U.S. PATENT DOCUMENTS

| | | | |
|---|---|---|---|
| 2015/0185583 A1 | 7/2015 | Mao et al. | |
| 2015/0208143 A1 | 7/2015 | Frisken | |
| 2015/0286187 A1 | 10/2015 | Collings et al. | |
| 2017/0214482 A1 | 7/2017 | Frisken | |
| 2017/0255078 A1 | 9/2017 | Jiang | |
| 2017/0299858 A1 | 10/2017 | Zong et al. | |
| 2018/0046016 A1 | 2/2018 | Zong et al. | |
| 2018/0095290 A1 | 4/2018 | Fan | |

FOREIGN PATENT DOCUMENTS

| | | |
|---|---|---|
| CN | 102282508 A | 12/2011 |
| CN | 102868476 A | 1/2013 |
| CN | 103281153 A | 9/2013 |
| CN | 103443700 A | 12/2013 |
| CN | 103703405 A | 4/2014 |
| CN | 104583824 A | 4/2015 |
| CN | 104597572 A | 5/2015 |
| CN | 104729710 A | 6/2015 |
| CN | 105093785 A | 11/2015 |
| CN | 107111063 A | 8/2017 |
| JP | 2015-526760 A | 9/2015 |
| WO | 2016/172903 A1 | 11/2016 |

WAVELENGTH SELECTIVE SWITCH, ALIGNMENT DIRECTION OBTAINING METHOD, AND LIQUID CRYSTAL ON SILICON AND METHOD FOR MANUFACTURING SAME

CROSS-REFERENCE TO RELATED APPLICATIONS

This application is a continuation of International Application No. PCT/CN2017/103538, filed on Sep. 26, 2017, the disclosure of which is hereby incorporated by reference in its entirety.

TECHNICAL FIELD

Embodiments relate to the field of optical communications, and, in particular, to a wavelength selective switch, an alignment direction obtaining method, and a liquid crystal on silicon and a method for manufacturing the same.

BACKGROUND

With rapid growth of network traffic and bandwidth, operators have an increasingly urgent requirement for an intelligent scheduling function of a bottom-layer wavelength division multiplexing network. As a result, an ROADM (reconfigurable optical add/drop multiplexer) is gradually used in networks of more and more high-end operators. After the ROADM is introduced to a network, an operator can quickly provide a wavelength-level service, thereby facilitating network planning to reduce an operation cost, and facilitating maintenance to reduce a maintenance cost.

A typical C (colorless) D (directionless) C (contentionless) ROADM node includes a line-side module and a client-side module. The line-side module is formed by stacking and interconnecting a plurality of wavelength selective switches (WSS). With capacity expansion of the network and wireless meshing (MESH) of a network architecture, a dimension requirement on the ROADM node is increasing, and a quantity of ports of a wavelength selective switch is required to increase accordingly.

However, currently, a loss value of a peripheral port of a wavelength selective switch based on a liquid crystal on silicon is far greater than a loss value of a central port, and an impact of the wavelength selective switch on performance of a system is mainly on a maximum insertion loss port. Consequently, performance of the wavelength selective switch is deteriorated, and a system loss is caused.

SUMMARY

Embodiments provide a wavelength selective switch, an alignment direction obtaining method, and a liquid crystal on silicon and a method for manufacturing the same.

To achieve the foregoing objectives, the following technical solutions are used in implementations of the embodiments.

According to a first aspect, an embodiment provides a liquid crystal on silicon, applied to a wavelength selective switch. The liquid crystal on silicon is used to diffract an incident beam in a linear polarization state to form a deflected beam. As an optical switching engine of the wavelength selective switch, the liquid crystal on silicon is used to implement a phase modulation effect, to independently control diffraction and deflection directions of beams that are incident to different areas of the liquid crystal on silicon.

The wavelength selective switch further includes at least one input port, at least one output port group corresponding to the input port, a polarization conversion unit, a wavelength division demultiplexer (for example, a diffraction grating), and a lens. Each output port group includes at least two output ports (for example, output optical fibers). A multi-wavelength signal forms an input beam through the input port. The polarization conversion unit converts the input beam into linearly polarized light corresponding to a working polarization state of the liquid crystal on silicon. The linearly polarized light is incident to the wavelength division demultiplexer, the wavelength division demultiplexer scatters wavelengths at different angles, and then the lens changes scattered beams into parallel beams to be incident to different positions of the liquid crystal on silicon. Beams of different wavelengths are focused on the different areas of the liquid crystal on silicon and are diffracted and deflected, the diffracted beams are restored to an original polarization state by using the polarization conversion unit, and the beams of different wavelengths are coupled to target output ports thereof. Because diffraction and deflection directions of the beams of different wavelengths are separately controlled in the different areas on the liquid crystal on silicon, the liquid crystal on silicon can switch any combination of wavelengths to any output port. The wavelength selective switch further includes a reflector, and the reflector is used to reflect a light ray.

The liquid crystal on silicon is used to diffract an incident beam in a linear polarization state to form a deflected beam. The liquid crystal on silicon includes a first panel, a second panel, a liquid crystal layer, a drive circuit, and two layers of alignment films. The first panel and the second panel are oppositely disposed, and the first panel is parallel to the second panel. The first panel may be a silicon backplane, and the second panel may be a translucent glass substrate. The liquid crystal layer is located between the first panel and the second panel. The drive circuit is configured to generate an electric field to control deflection of a liquid crystal in the liquid crystal layer. The two layers of alignment films are located on two opposite sides of the liquid crystal layer. For example, one layer of alignment film is located between the liquid crystal layer and the first panel, and the other layer of alignment film is located between the liquid crystal layer and the second panel. The alignment film is used to enable the liquid crystal in the liquid crystal layer to have an initial orientation.

Optionally, the drive circuit includes a first electrode layer and a second electrode layer. The first electrode layer is located between the liquid crystal layer and the first panel, and the second electrode layer is located between the liquid crystal layer and the second panel. For example, the first electrode layer is formed on one side of the first panel facing the liquid crystal layer, the second electrode layer is formed on one side of the second panel facing the liquid crystal layer, and the two layers of alignment films are located between the first electrode layer and the second electrode layer. When the first electrode layer and the second electrode layer are energized, the deflection of the liquid crystal in the liquid crystal layer is controlled in a vertically-aligned drive manner.

When voltages are loaded to the first electrode layer and the second electrode layer, and when an electric field is formed between the first electrode layer and the second electrode layer, the liquid crystal in the liquid crystal layer is deflected. In an embodiment, a liquid crystal long axis of the liquid crystal in the liquid crystal layer is deflected from a direction approximately parallel to the first panel to a direction approximately perpendicular to the first panel. In another embodiment, a liquid crystal long axis in the liquid crystal layer may be alternatively deflected from a direction approximately perpendicular to the first panel to a direction approximately parallel to the first panel. Because the liquid crystal is a birefringent material, the deflection of the liquid crystal may bring a change of an equivalent refractive index, thereby achieving a phase modulation effect. In addition, an angle by which a liquid crystal molecule is deflected is related to values of the voltages loaded to the first electrode layer and the second electrode layer. Therefore, different phase modulation amounts may be implemented by loading different voltages.

The wavelength selective switch needs to switch an output port for beams of different wavelengths, and when the beams of different wavelengths are incident to a surface of the liquid crystal on silicon, the beams of different wavelengths occupy different areas. When voltage information is loaded to the drive circuit, voltage information of pixel areas corresponding to different wavelength channels in a port switching direction is different, to form phase gratings with different phase periods. The phase grating is a reflective blazed grating with a $2\pi$ step change, so that diffracted light energy of a beam is concentrated in a predetermined direction, that is, concentrated in a spectral order (for example, +1 order). When detected from this direction, spectral intensity is the greatest. Due to a diffraction effect of a grating, gratings of different phase periods may implement different diffraction angles, so that corresponding signals are output at different ports. A diffraction principle of the liquid crystal on silicon is: it may be understood according to a grating equation $\Lambda_1 (\sin \theta + \sin Bm) = m\lambda$ that a diffraction angle $Bm$ of signal light (m=+1 order) may be implemented by controlling a phase period $\Lambda_1$, where $\theta$ is an incident angle. The output port group includes N output ports (N is an integer greater than or equal to 2), and diffraction angles required by deflected beams corresponding to the N output ports are different. For example, a diffraction angle required by a deflected beam corresponding to an output port located in a central area is relatively small, while a diffraction angle required by a deflected beam corresponding to an output port located in a peripheral area is large. A more peripheral port requires a larger diffraction angle, and corresponds to a smaller phase grating period. Due to a twisted effect of the liquid crystal molecule, when a phase grating period is very small and a voltage gradient is very large, the liquid crystal molecule in the liquid crystal layer not only is deflected in a plane perpendicular to the first panel, but also is rotated in a plane parallel to the first panel. As a result, rotation occurs in a polarization state of the deflected beam, and the deflected beam is further enabled to generate a polarization loss and an insufficient diffraction loss. This increases a loss of the wavelength selective switch.

The liquid crystal on silicon has a first pixel area. There are a plurality of first sub-pixel areas in first pixel area, and incident beams of different wavelengths are incident to different sub-pixel areas. The liquid crystal layer includes a first liquid crystal located in the first pixel area. The first liquid crystal is all liquid crystals of the liquid crystal layer located in the first pixel area. Under control of the electric field, the first liquid crystal is deflected in the plane perpendicular to the first panel. In this case, the liquid crystal on silicon forms a plurality of first phase gratings with different phase periods in the first pixel area, the plurality of first phase gratings are in one-to-one correspondence with the plurality of first sub-pixel areas, and the plurality of first phase gratings are used to diffract the incident beams of different wavelengths. In this way, the incident beams of different wavelengths are deflected to form deflected beams with different diffraction and deflection directions. Under the control of the electric field, the first liquid crystal is further deflected towards a first direction in the plane parallel to the first panel. In this case, because phase periods and voltage gradients are different, deflection angles of different parts of the first liquid crystal that are located in the different first sub-pixel areas are different, but deflection directions are the same, to be specific, all the different parts are deflected towards the first direction. The alignment film includes a first partial alignment film located in the first pixel area. An alignment direction of the first partial alignment film is deflected towards a second direction relative to a polarization direction of the incident beam. The second direction is opposite to the first direction to reduce a loss of the deflected beam.

In this embodiment, the alignment direction of the first partial alignment film of the alignment film is deflected towards the second direction relative to the polarization direction of the incident beam, and the second direction is opposite to the first direction. Therefore, when the liquid crystal on silicon is energized and when the first liquid crystal is deflected towards the first direction in the plane parallel to the first panel, the initial orientation that is brought by the alignment film and that of the first liquid crystal offsets at least a part of a deflection angle of the first liquid crystal in the plane parallel to the first panel. In this way, a deflection angle between the first liquid crystal and the polarization direction of the incident beam is reduced, and a rotation angle of a polarization state of the deflected beam is reduced, so that a polarization loss and an insufficient diffraction loss of the deflected beam are relatively low, a loss of the wavelength selective switch is relatively small, and performance of the wavelength selective switch is optimized.

It may be understood that the alignment direction of the alignment film may be implemented by using an existing alignment process (for example, rubbing alignment, chemical alignment, or optical alignment), and any hardware device does not need to be added. Therefore, there is no additional cost. In addition, a preparation process of the liquid crystal on silicon does not need to be changed, and only a parameter in an alignment process needs to be changed. Therefore, an alignment method has strong implementability, a low cost, and a wide application scope. The alignment direction is an orientation of a polymer molecule in the alignment film. The alignment direction influences the initial orientation of the liquid crystal in the liquid crystal layer. In an embodiment, the first partial alignment film of the alignment film is aligned in a rubbing alignment manner. A rubbing advancing direction of a rubbing roller (rubbing roller) that uses the rubbing alignment manner is the same as the alignment direction of the first partial alignment film. That the second direction is opposite to the first direction means that deflection trends of the two directions are opposite. For example, if the second direction is anti-clockwise deflection, the first direction is clockwise deflection, or if the second direction is clockwise deflection, the first direction is anti-clockwise deflection.

Optionally, when a working voltage is applied to the liquid crystal on silicon, the first liquid crystal is deflected in a plane perpendicular to the first panel, and is deflected towards a first direction in a plane parallel to the first panel, so that a plurality of first phase gratings with different phase periods are formed in the first pixel area. The working voltage corresponds to phase periods of the plurality of first phase gratings. A testing liquid crystal on silicon is provided, where a difference between the testing liquid crystal on silicon and the liquid crystal on silicon lies in that alignment directions of alignment films are different. An alignment film of the testing liquid crystal on silicon is aligned along an initial direction, where the testing liquid crystal on silicon has a testing liquid crystal. A testing voltage the same as the working voltage is applied to the testing liquid crystal on silicon, so that the testing liquid crystal performs a deflection action the same as that of the first liquid crystal. A deflection direction of the testing liquid crystal is detected to obtain a second direction opposite to the direction. The alignment direction of the first partial alignment film is designed based on the second direction.

For example, the first liquid crystal forms a plurality of first phase gratings under the control of the electric field, and an alignment direction obtaining method of the first partial alignment film includes:

providing a testing liquid crystal on silicon, where an alignment film of the testing liquid crystal on silicon is aligned along an initial direction;

loading a testing voltage to the testing liquid crystal on silicon to form a testing phase grating, where the testing phase grating is the same as the first phase grating;

transmitting a linearly polarized incident beam to the testing liquid crystal on silicon, where a polarization direction of the incident beam is the same as the initial direction;

detecting that a polarization direction of a deflected beam diffracted by the testing liquid crystal on silicon is a testing direction; and obtaining the alignment direction of the first partial alignment film, where a deflection direction of the alignment direction of the first partial alignment film relative to the initial direction is opposite to a deflection direction of the testing direction relative to of the initial direction.

In an optional embodiment, the first liquid crystal forms a plurality of first phase gratings under the control of the electric field. A phase grating with a minimum phase period in the plurality of first phase gratings is a first peripheral phase grating. In the plurality of first phase gratings, a diffraction angle of the deflected beam corresponding to the first peripheral phase grating is the largest, to input the deflected beam to the most peripheral output port. Under the electric field of the drive circuit, a liquid crystal for forming the first peripheral phase grating (hereinafter referred to as a first peripheral liquid crystal, which is a part of the first liquid crystal) is deflected by a first angle towards the first direction. A liquid crystal for forming another first phase grating other than the first peripheral phase grating (hereinafter referred to as a first non-peripheral liquid crystal, which is a part of the first liquid crystal) is deflected by an angle less than the first angle towards the first direction. A second angle is formed between the alignment direction of the first partial alignment film and the polarization direction of the incident beam. The second angle is designed based on the first angle, and the second angle is close to the first angle. In an embodiment, a ratio of the second angle to the first angle is 0.8 to 1.2. For example, the second angle is equal to the first angle.

In this embodiment, the second angle is close to the first angle. Therefore, when the liquid crystal on silicon is energized and when the first liquid crystal is deflected towards the first direction in the plane parallel to the first panel, the initial orientation that is brought by the alignment film and that is used for the first peripheral liquid crystal completely or almost completely offsets a deflection angle of the first peripheral liquid crystal in the plane parallel to the first panel. Rotation does not occur in a polarization direction of a deflected beam diffracted by the first peripheral phase grating, and consequently, generation of a polarization loss and an insufficient diffraction loss is avoided, so that a loss of the most peripheral output port of the wavelength selective switch is reduced. In this way, losses of output ports of the wavelength selective switch are balanced, an overall loss of the wavelength selective switch is relatively small, and performance of the wavelength selective switch is optimized.

It may be understood that, alignment directions of the first partial alignment film of the alignment film are the same, all angles by which the first non-peripheral liquid crystal is deflected towards the first direction are less than the first angle. Therefore, when the liquid crystal on silicon is energized and when the first liquid crystal is deflected towards the first direction in the plane parallel to the first panel, the initial orientation that is brought by the first partial alignment film of the alignment film and that is of the first non-peripheral liquid crystal not only offsets a deflection angle of the first non-peripheral liquid crystal in the plane parallel to the first panel, but also forms an angle between a liquid crystal long axis direction of the first non-peripheral liquid crystal and a deflection direction of the incident beam. Rotation occurs in a polarization direction of the deflected beam diffracted by the another first phase grating other than the first peripheral phase grating, thereby generating a polarization loss and an insufficient diffraction loss. In addition, a polarized beam with a smaller required diffraction angle has a larger loss generated by the alignment film. However, a beam further has another loss (for example, a diffraction loss of the liquid crystal on silicon, a system coupling loss, a transmission loss of each component, or a module assembly loss) in a transmission process of the wavelength selective switch, and a loss of a peripheral output port (corresponding to the first peripheral liquid crystal) requiring a larger diffraction angle is much larger than a loss of an intermediate output port (corresponding to the first non-peripheral liquid crystal) requiring a smaller diffraction angle. Therefore, even if a beam output from the intermediate output port has a polarization loss and an insufficient diffraction loss, total losses of the beam output from the intermediate output port in the wavelength selective switch is also less than or substantially equal to total losses of a beam output from the peripheral output port in the wavelength selective switch. Losses of ports of the wavelength selective switch are balanced, thereby achieving optimal system performance. The liquid crystal on silicon can equalize losses of beams corresponding to the output ports of the wavelength selective switch. Therefore, this helps to design a plurality of output ports of the wavelength selective switch.

In an optional embodiment, the liquid crystal on silicon further has a second pixel area. In this case, there are at least two input ports, and there are at least two output port groups, and after diffracted and deflected in the first pixel area and the second pixel area, beams of the two input ports enter different output ports of the two output port groups. There is a plurality of second sub-pixels in the second pixel area, and incident beams of different wavelengths are incident to the different sub-pixel areas. The liquid crystal layer further includes a second liquid crystal located in the second pixel area. The second liquid crystal is all liquid crystals of the liquid crystal layer located in the second pixel area. Under control of the electric field, the second liquid crystal is deflected in the plane perpendicular to the first panel. In this case, the liquid crystal on silicon forms a plurality of second phase gratings with different phase periods in the second pixel area, the plurality of second phase gratings are in one-to-one correspondence with the plurality of second sub-pixel areas, and the plurality of second phase gratings are used to diffract the incident beams of different wavelengths. In this way, the incident beams of different wavelengths are deflected to form the deflected beams with different diffraction and deflection directions. Under the control of the electric field, the second liquid crystal is deflected towards a third direction in the plane parallel to the first panel. In this case, because phase periods and voltage gradients are different, deflection angles of different parts of the second liquid crystal that are located in different second sub-pixel areas are different, but deflection directions are the same, for example, the different parts are deflected towards the third direction. The alignment film further includes a second partial alignment film located in the second pixel area. An alignment direction of the second partial alignment film is deflected towards a fourth direction relative to a polarization direction of the beam. The fourth direction is opposite to the third direction to reduce a loss of the deflected beam.

In this embodiment, the alignment direction of the second partial alignment film of the alignment film is deflected towards the fourth direction relative to the polarization direction of the incident beam, and the fourth direction is opposite to the third direction. Therefore, when the liquid crystal on silicon is energized and when the second liquid crystal is deflected towards the third direction in the plane parallel to the first panel, the initial orientation that is brought by the alignment film and that is of the second liquid crystal offsets at least a part of a deflection angle of the second liquid crystal in the plane parallel to the first panel. In this way, a deflection angle between the second liquid crystal and the polarization direction of the incident beam is reduced, and a rotation angle of a polarization state of the deflected beam is reduced, so that a polarization loss and an insufficient diffraction loss of the deflected beam are relatively low, a loss of the wavelength selective switch is relatively small, and performance of the wavelength selective switch is optimized.

It may be understood that the liquid crystal on silicon can diffract and deflect incident beams generated from the two input ports (for example, a first input port and a second input port), to form two parts of deflected beams. The deflected beams are input into the two output port groups (for example, a first output port group and a second output port group). The first partial alignment film of the alignment film is designed based on deflection of the first liquid crystal in the first pixel area, and the second partial alignment film is designed based on deflection of the second liquid crystal in the second pixel area. Therefore, the first partial alignment film and the second partial alignment film can meet initial orientation requirements of the liquid crystals in the pixel areas thereof, and do not affect each other. In this way, the liquid crystal on silicon can meet a requirement on a larger quantity of output port groups.

In an optional embodiment, the second liquid crystal forms a plurality of second phase gratings under the control of the electric field. A phase grating with a minimum phase period in the plurality of second phase gratings is a second peripheral phase grating. In the plurality of second phase gratings, a diffraction angle of the deflected beam corresponding to the second peripheral phase grating is the largest, to input the deflected beam to the most peripheral output port. Under the electric field of the drive circuit, a liquid crystal for forming the second peripheral phase grating (hereinafter referred to as a second peripheral liquid crystal, which is a part of the second liquid crystal) is deflected by a third angle towards the third direction. A liquid crystal for forming another second phase grating other than the second peripheral phase grating (hereinafter referred to as a second non-peripheral liquid crystal, which is a part of the second liquid crystal) is deflected by an angle less than the third angle towards the third direction. A fourth angle is formed between the alignment direction of the second partial alignment film and the polarization direction of the beam. The fourth angle is designed based on the third angle, and the fourth angle is close to the third angle. In an embodiment, a ratio of the fourth angle to the third angle is 0.8 to 1.2. For example, the fourth angle is equal to the third angle.

In this embodiment, the fourth angle is close to the third angle. Therefore, when the liquid crystal on silicon is energized and when the second liquid crystal is deflected towards the third direction in the plane parallel to the first panel, the initial orientation that is brought by the alignment film and that is used for the second peripheral liquid crystal completely or almost completely offsets a deflection angle of the second peripheral liquid crystal in the plane parallel to the first panel. Rotation does not occur in a polarization direction of a deflected beam diffracted by the second peripheral phase grating, and consequently, generation of a polarization loss and an insufficient diffraction loss is avoided, so that a loss of the most peripheral output port of the wavelength selective switch is reduced. In this way, losses of output ports of the wavelength selective switch are balanced, an overall loss of the wavelength selective switch is relatively small, and performance of the wavelength selective switch is optimized.

In an optional embodiment, the third direction is opposite to the first direction. For example, a beam input from the first input port performs upward diffraction and deflection on the plurality of first phase gratings generated in the first pixel area, to output a formed deflected beam to the first output port group. A beam input from the second input port performs downward diffraction and deflection on the plurality of second phase gratings generated in the second pixel area, to output a formed deflected beam to the second output port group. In this embodiment, the liquid crystal on silicon can meet diffraction requirements of different deflection directions.

When the first partial alignment film and the second partial alignment film of the alignment film are aligned in a rubbing alignment manner, a rubbing advancing direction of a rubbing roller (rubbing roller) that uses the rubbing alignment manner and that is on the first partial alignment film is the same as the alignment direction of the first partial alignment film, and a rubbing advancing direction of the second partial alignment film is the same as the alignment direction of the second partial alignment film.

In an optional embodiment, the third direction is the same as the first direction. The second liquid crystal forms a plurality of second phase gratings under the control of the electric field. A phase grating with a minimum phase period in the plurality of second phase gratings is a second peripheral phase grating, and a liquid crystal for forming the second peripheral phase grating is deflected by a third angle towards the third direction, where the third angle is the same as the first angle, and the alignment direction of the second partial alignment film is the same as the alignment direction of the first partial alignment film. In this embodiment, a design of the first output port group corresponding to the first pixel area and a design of the second output port group corresponding to the second pixel area may be the same or different. For example, when required maximum diffraction angles are the same, quantities of output ports may be different. Alternatively, when required maximum diffraction angles are the same, and quantities of output ports are also the same, diffraction angles required by some ports are different. It may be understood that, because the alignment direction of the second partial alignment film and the alignment direction of the first partial alignment film are the same, an alignment process of the alignment film can be simplified, and an alignment cost of the alignment film can be reduced.

In an optional embodiment, the liquid crystal on silicon may further include a third pixel area, to meet diffraction and deflection requirements of a third input port and a third output port group. For a design method of a third partial alignment film of an alignment film corresponding to the third pixel area, refer to a design method of the first partial alignment film and/or a design method of the second partial alignment film. Additionally, in some embodiments, the liquid crystal on silicon may further include more pixel areas.

According to a second aspect, an embodiment further provides a wavelength selective switch including the foregoing liquid crystal on silicon. Losses of output ports of the wavelength selective switch are relatively low, the losses of the output ports are relatively balanced, and a system loss of the wavelength selective switch is relatively low.

According to a third aspect, an embodiment further provides an alignment direction obtaining method, applied to an alignment film of a liquid crystal on silicon. Alignment directions of the first partial alignment film, the second partial alignment film, and the third partial alignment film of the alignment film in the foregoing embodiments can be obtained by using the alignment direction obtaining method.

The alignment direction obtaining method includes:

providing a testing liquid crystal on silicon, where an alignment film of the testing liquid crystal on silicon is aligned along an initial direction;

loading a testing voltage to the testing liquid crystal on silicon to form a testing phase grating;

transmitting a linearly polarized incident beam to the testing liquid crystal on silicon, where a polarization direction of the incident beam is the same as the initial direction, an input beam is adjusted by using a polarizer to form an incident beam in a linear polarization state, and a polarization direction of the polarizer is the same as the initial direction;

detecting that a polarization direction of a deflected beam diffracted by the testing liquid crystal on silicon is a testing direction, recording, by using a rotary analyzer, an angle at which +1 order diffractive light intensity is the greatest, and obtaining the testing direction at the angle; and obtaining an alignment direction of the alignment film of the liquid crystal on silicon, where a deflection direction of the alignment direction relative to the initial direction is opposite to a deflection direction of the testing direction relative to the initial direction. For example, if the testing direction is deflected towards a first direction relative to the initial direction, the alignment direction is deflected towards a second direction relative to the initial direction, where the second direction is opposite to the first direction.

In this embodiment, the deflection direction of the deflected beam is detected to obtain the alignment direction of the alignment film. The obtaining method is highly efficient and highly accurate, and obtaining alignment directions corresponding to the alignment films based on different diffraction and deflection requirements has high flexibility and a wide application range.

In an optional embodiment, the testing liquid crystal on silicon has a plurality of phase gratings with a same diffraction steering direction, and phase periods of the plurality of phase gratings form a phase period range. For example, the testing liquid crystal on silicon is used to form a plurality of phase gratings with a same diffraction steering direction, and phase periods corresponding to these phase gratings jointly form the phase period range, and a phase period of the testing phase grating is a minimum value in the phase period range. According to a grating equation, a larger diffraction angle indicates a smaller phase period. Therefore, the minimum value in the phase period range corresponds to a phase grating that generates a maximum diffraction angle. The phase grating corresponding to the maximum diffraction angle is selected as the testing phase grating. In this way, the polarization direction and a deflection angle of the deflected beam can be obtained more accurately, thereby helping to improve accuracy of the alignment direction obtaining method.

In an optional embodiment, a first angle is formed between the testing direction and the initial direction, a second angle is formed between the alignment direction and the initial direction, and the second angle is close to the first angle. In an embodiment, a ratio of the second angle to the first angle is 0.8 to 1.2. For example, the second angle is equal to the first angle. Because the second angle is close to the first angle, with the use of the alignment film in the alignment direction, the liquid crystal of the liquid crystal on silicon can have a better initial orientation, to offset a deflection angle of the liquid crystal in the plane parallel to the first panel. In this way, rotation does not occur in a polarization direction of the deflected beam with a maximum diffraction angle, and generation of a polarization loss and an insufficient diffraction loss is avoided, so that a loss of the output port at the most peripheral of the wavelength selective switch is reduced. In this way, losses of output ports of the wavelength selective switch are balanced, an overall loss of the wavelength selective switch is relatively small, and performance of the wavelength selective switch is optimized.

According to a fourth aspect, an embodiment further provides a method for manufacturing a liquid crystal on silicon. The method for manufacturing a liquid crystal on silicon may be used to manufacture the liquid crystal on silicon in the foregoing embodiment. The liquid crystal on silicon is used to diffract an incident beam in a linear polarization state to form a deflected beam. The method for manufacturing a liquid crystal on silicon includes:

obtaining the alignment direction by using the alignment direction obtaining method according to the foregoing embodiment, where the alignment direction is deflected towards a second direction relative to a polarization direction of the incident beam;

providing a first panel, coating a first layer of alignment film on the first panel, and aligning the first layer of alignment film, so that an alignment direction of the first layer of alignment film is deflected towards the second direction relative to the polarization direction of the incident beam;

providing a second panel, coating a second layer of alignment film on the second panel, and aligning the second layer of alignment film, where an alignment direction of the second layer of alignment film is the same as the alignment direction of the first layer of alignment film; and laminating the first panel and the second panel, and filling a liquid crystal layer between the first panel and the second panel to form the liquid crystal on silicon, where a circuit on the first panel and a circuit on the second panel jointly form a drive circuit, under an electric field generated by the drive circuit, a liquid crystal in the liquid crystal layer is deflected in a plane perpendicular to the first panel, and is deflected towards a first direction in a plane parallel to the first panel, and the first direction is opposite to the second direction.

In this embodiment, the alignment direction of the first layer of alignment film and the alignment direction of the second layer of alignment film are deflected towards the second direction relative to the polarization direction of the incident beam, and the second direction is opposite to the first direction. Therefore, when the liquid crystal on silicon is energized and when the liquid crystal in the liquid crystal layer is deflected towards the first direction in the plane parallel to the first panel, an initial orientation that is brought by the alignment film and that is of the liquid crystal layer offsets at least a part of a deflection angle of the liquid crystal in the plane parallel to the first panel. In this way, a deflection angle between the liquid crystal in the liquid crystal layer and the polarization direction of the incident beam is reduced, and a rotation angle of a polarization state of the deflected beam is reduced, so that a polarization loss and an insufficient diffraction loss of the deflected beam are relatively low, a loss of the wavelength selective switch is relatively small, and performance of the wavelength selective switch is optimized.

The liquid crystal layer may be filled after the first panel and the second panel are laminated. Alternatively, a liquid crystal filling area may be defined on the first panel by using a plastic frame, and then the first panel and the second panel are laminated after a liquid crystal is filled in the liquid crystal filling area to form the liquid crystal layer.

In an optional embodiment, an alignment direction obtaining method of the first layer of alignment film includes:

providing a testing liquid crystal on silicon, where an alignment film of the testing liquid crystal on silicon is aligned along an initial direction;

loading a testing voltage to the testing liquid crystal on silicon to form a testing phase grating;

transmitting a linearly polarized incident beam to the testing liquid crystal on silicon, where a polarization direction of the incident beam is the same as the initial direction;

detecting that a polarization direction of a deflected beam diffracted by the testing liquid crystal on silicon is a testing direction; and obtaining an alignment direction of the first layer of alignment film, where a deflection direction of the alignment direction of the first layer of alignment film relative to the initial direction is opposite to a deflection direction of the testing direction relative to the initial direction.

In this embodiment, the deflection direction of the deflected beam is detected to obtain the alignment direction of the first layer of alignment film. The obtaining method is highly efficient and highly accurate, and obtaining alignment directions corresponding to the alignment films based on different diffraction and deflection requirements has high flexibility and a wide application range.

The testing liquid crystal on silicon has a plurality of phase gratings with a same diffraction steering direction, phase periods of the plurality of phase gratings form a phase period range, and a phase period of the testing phase grating is a minimum value in the phase period range. According to a grating equation, a larger diffraction angle indicates a smaller phase period. Therefore, the minimum value in the phase period range corresponds to a phase grating that generates a maximum diffraction angle. The phase grating corresponding to the maximum diffraction angle is selected as the testing phase grating. In this way, the polarization direction and a deflection angle of the deflected beam can be obtained more accurately, thereby helping to improve accuracy of the alignment direction obtaining method.

A first angle is formed between the testing direction and the initial direction, a second angle is formed between the alignment direction and the initial direction, and a ratio of the second angle to the first angle is 0.8 to 1.2. For example, the second angle is equal to the first angle. Because the second angle is close to the first angle, with the use of the alignment film in the alignment direction, the liquid crystal of the liquid crystal on silicon can have a better initial orientation, to offset a deflection angle of the liquid crystal in the plane parallel to the first panel. In this way, rotation does not occur in a polarization direction of the deflected beam with a maximum diffraction angle, and generation of a polarization loss and an insufficient diffraction loss is avoided, so that a loss of the output port at the most peripheral of the wavelength selective switch is reduced. In this way, losses of output ports of the wavelength selective switch are balanced, an overall loss of the wavelength selective switch is relatively small, and performance of the wavelength selective switch is optimized.

DESCRIPTION OF EMBODIMENTS

The following describes the embodiments with reference to the accompanying drawings in the embodiments.

Figure 1:
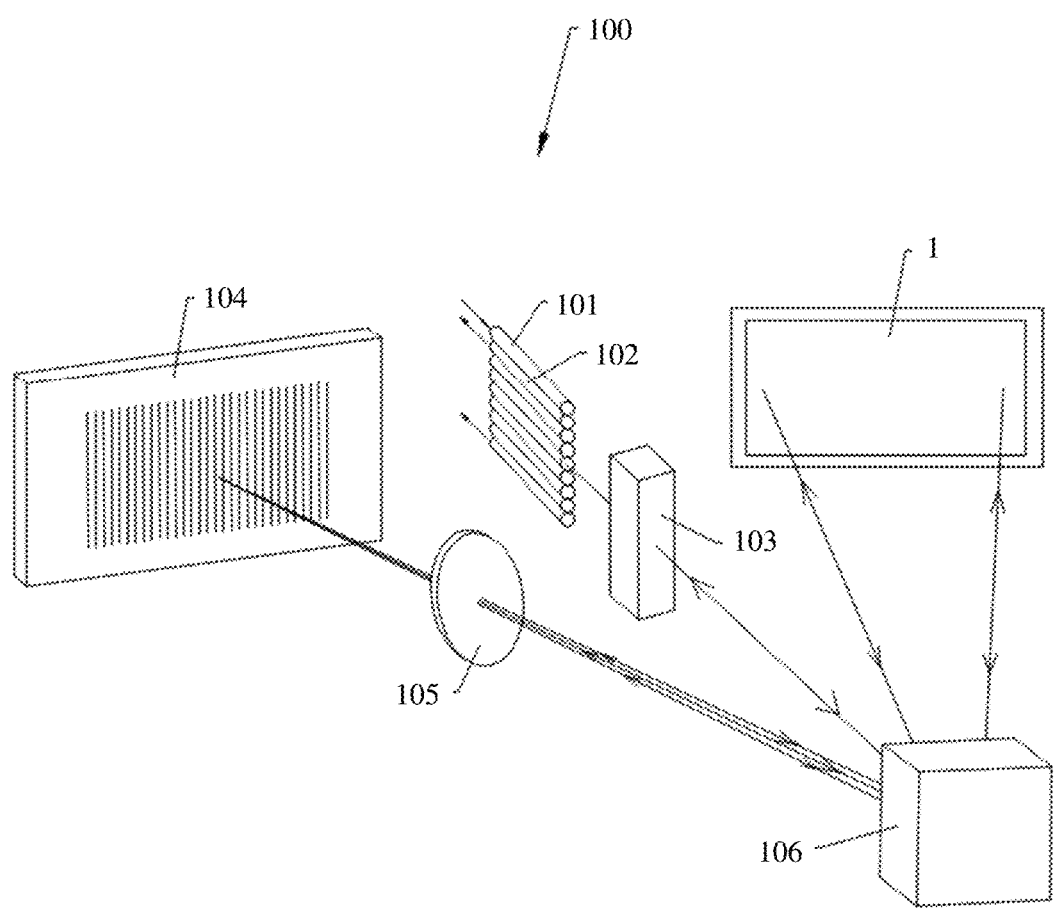
FIG. 1 is a schematic diagram of a wavelength selective switch according to an embodiment.

Referring to FIG. 1, an embodiment provides a wavelength selective switch (Wavelength selective switch, WSS) 100. The wavelength selective switch 100 may be applied to an ROADM (reconfigurable optical add/drop multiplexer). The wavelength selective switch 100 includes a liquid crystal on silicon 1. The liquid crystal on silicon 1 is used as an optical switching engine of the wavelength selective switch 100, and is used to achieve a phase modulation effect, to independently control diffraction and deflection directions of beams incident to different areas of the liquid crystal on silicon 1.

The wavelength selective switch 100 further includes at least one input port 101 (for example, an input optical fiber), at least one output port group corresponding to the input port 101, a polarization conversion unit 103, a wavelength division demultiplexer 104 (for example, a diffraction grating), and a lens 105. Each output port group includes at least two output ports 102 (for example, output optical fibers). As shown in FIG. 1, a beam transmission path in the figure is a reciprocal path. A multi-wavelength signal forms an input beam through the input port 101. The polarization conversion unit 103 converts the input beam into linearly polarized light corresponding to a working polarization state of the liquid crystal on silicon 1. The linearly polarized light is incident to the wavelength division demultiplexer 104, the wavelength division demultiplexer 104 scatters wavelengths at different angles, and then the lens 105 changes scattered beams into parallel beams to be incident to different positions of the liquid crystal on silicon 1. The beams of different wavelengths are focused on the different areas of the liquid crystal on silicon 1 and are diffracted and deflected, the diffracted beams are restored to an original polarization state by using the polarization conversion unit 103, and the beams of different wavelengths are coupled to target output ports 102 thereof. Because diffraction and deflection directions of the beams of different wavelengths are separately controlled in the different areas on the liquid crystal on silicon 1, the liquid crystal on silicon 1 can switch any combination of wavelengths to any output port 102. The wavelength selective switch 100 further includes a reflector 106, and the reflector 106 is used to reflect a light ray.

Figure 2:
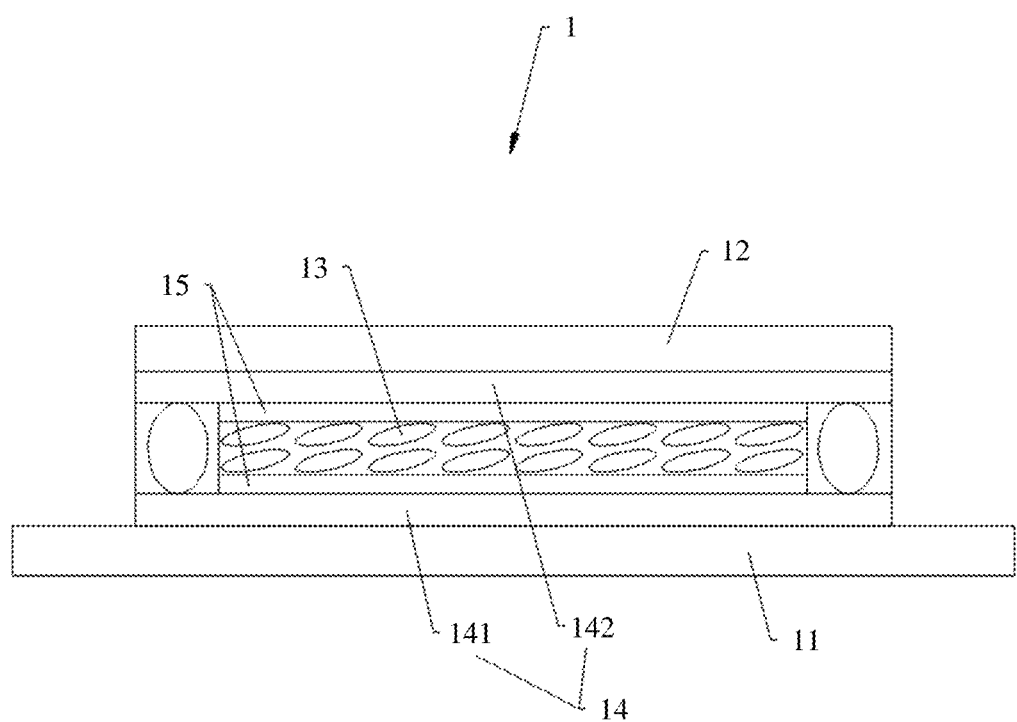
FIG. 2 is a schematic structural diagram of a liquid crystal on silicon of the wavelength selective switch shown in FIG. 1.

Referring to FIG. 2, an embodiment further provides a liquid crystal on silicon 1, applicable to the wavelength selective switch 100. The liquid crystal on silicon 1 is used to diffract an incident beam in a linear polarization state to form a deflected beam. The liquid crystal on silicon 1 is a polarization sensitive device, and can work in only one polarization direction (that is, a working polarization direction), and a polarization direction of the incident beam is the working polarization direction of the liquid crystal on silicon 1. The liquid crystal on silicon 1 includes a first panel 11, a second panel 12, a liquid crystal layer 13, a drive circuit 14, and two layers of alignment films 15. The first panel 11 and the second panel 12 are oppositely disposed, and the first panel 11 is parallel to the second panel 12. The first panel 11 may be a silicon backplane and the second panel 12 may be a translucent glass substrate. The liquid crystal layer 13 is located between the first panel 11 and the second panel 12. The drive circuit 14 is configured to generate an electric field to control deflection of a liquid crystal in the liquid crystal layer 13. The two layers of alignment films 15 are located on two opposite sides of the liquid crystal layer 13. For example, one layer of alignment film 15 is located between the liquid crystal layer 13 and the first panel 11, and the other layer of alignment film is located between the liquid crystal layer 13 and the second panel 12. The alignment film 15 is used to enable the liquid crystal in the liquid crystal layer 13 to have an initial orientation.

Optionally, the drive circuit 14 includes a first electrode layer 141 and a second electrode layer 142. The first electrode layer 141 is located between the liquid crystal layer 13 and the first panel 11, and the second electrode layer 142 is located between the liquid crystal layer 13 and the second panel 12. For example, the first electrode layer 141 is formed on one side of the first panel 11 facing the liquid crystal layer 13, the second electrode layer 142 is formed on one side the second panel 12 facing the liquid crystal layer 13, and the two layers of alignment films 15 are located between the first electrode layer 141 and the second electrode layer 142. When the first electrode layer 141 and the second electrode layer 142 are energized, the deflection of the liquid crystal in the liquid crystal layer 13 is controlled in a vertically aligned (VA) drive manner.

Figure 3:
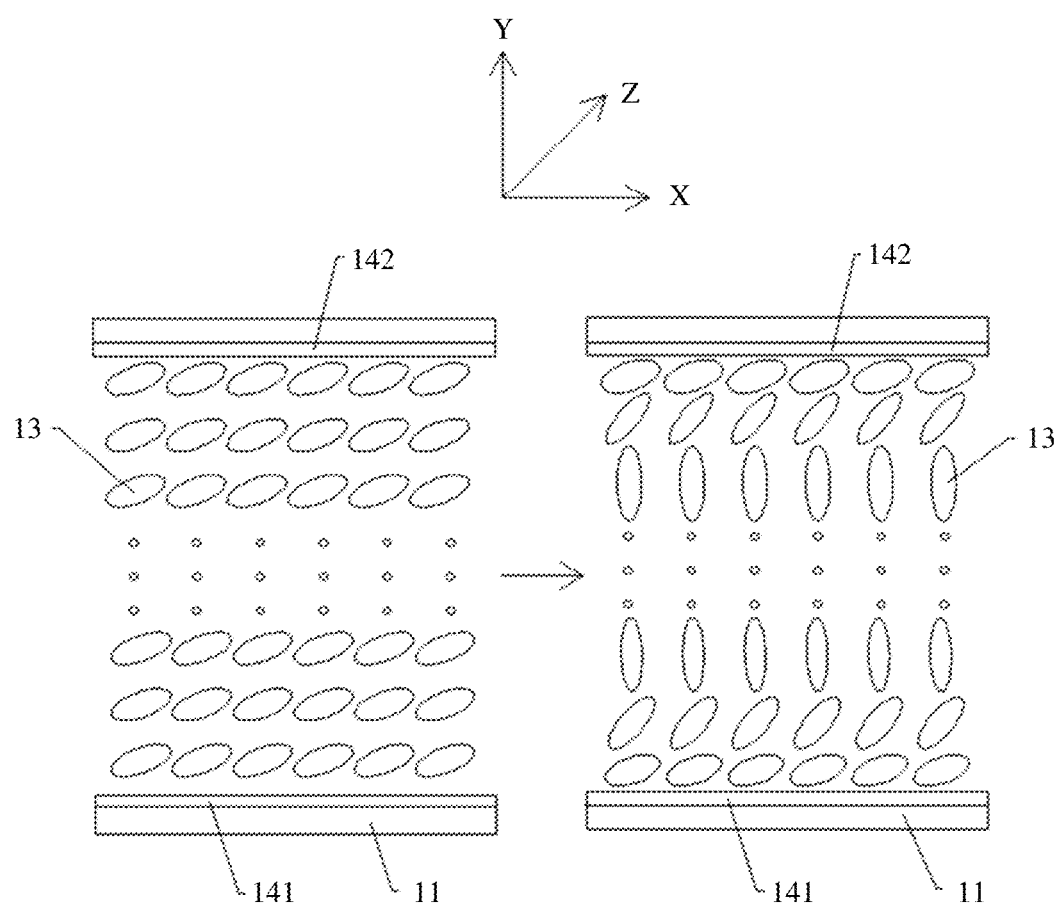
FIG. 3 is a schematic diagram of liquid crystal rotation in the liquid crystal on silicon shown in FIG. 2.

Referring to FIG. 2 and FIG. 3, when voltages are loaded to the first electrode layer 141 and the second electrode layer 142, and when an electric field is formed between the first electrode layer 141 and the second electrode layer 142, the liquid crystal in the liquid crystal layer 13 is deflected (a deflection plane is an XY plane in FIG. 3, that is, a plane perpendicular to the first panel 11). In an embodiment, the liquid crystal in the liquid crystal layer 13 is deflected from a state in the left diagram in FIG. 3 to a state in the right diagram in FIG. 3, to be specific, a liquid crystal long axis is deflected from a direction approximately parallel to the first panel 11 to a direction approximately perpendicular to the first panel 11. This is used as an example for description in this application. In another embodiment, a liquid crystal long axis in the liquid crystal layer 13 may be alternatively deflected from a direction approximately perpendicular to the first panel 11 to a direction approximately parallel to the first panel 11. Because the liquid crystal is a birefringent material, the deflection of the liquid crystal may bring a change of an equivalent refractive index, thereby achieving a phase modulation effect. In addition, an angle by which a liquid crystal molecule is deflected is related to values of the voltages loaded to the first electrode layer 141 and the second electrode layer 142. Therefore, different phase modulation amounts may be implemented by loading different voltages.

Figure 4:
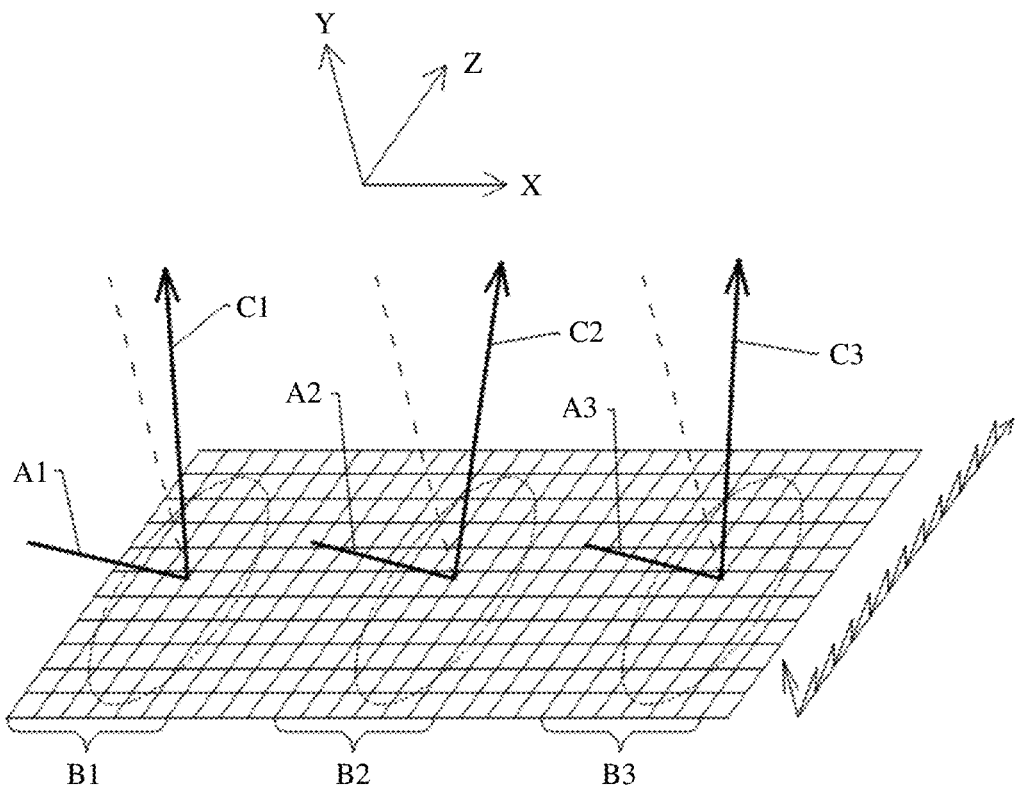
FIG. 4 is a schematic diagram of arrangement and diffraction of an incident beam on the liquid crystal on silicon shown in FIG. 2.
Figure 5:
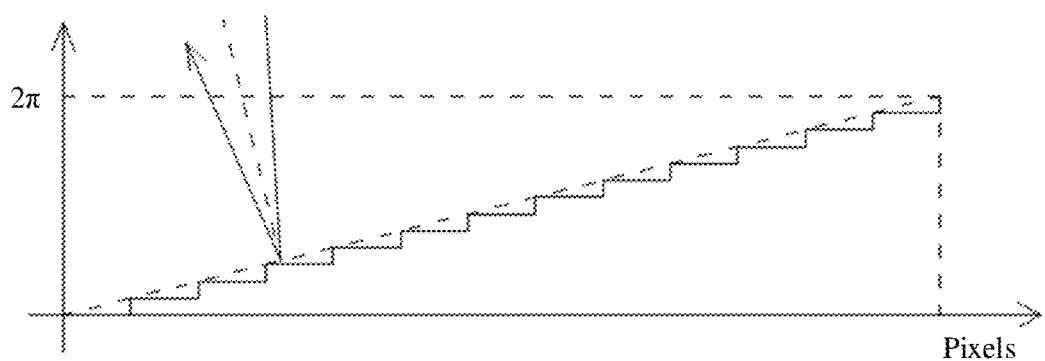
FIG. 5 is a schematic diagram of a phase grating in an area B1 in FIG. 4.
Figure 6:
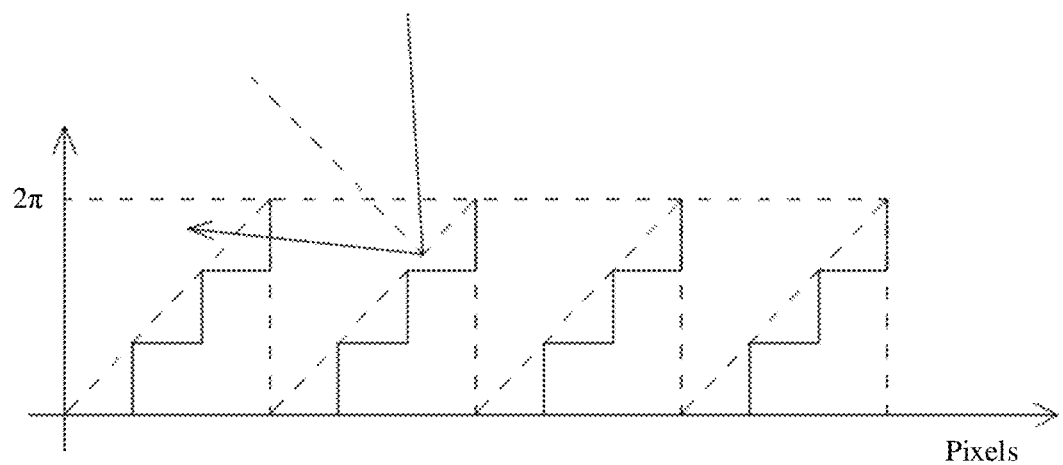
FIG. 6 is a schematic diagram of a phase grating in an area B2 in FIG. 4.
Figure 7:
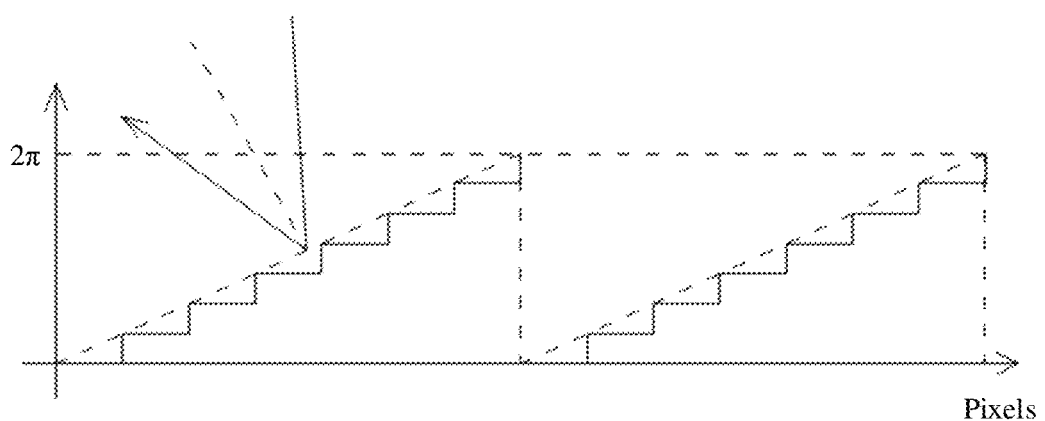
FIG. 7 is a schematic diagram of a phase grating in an area B3 in FIG. 4.
Figure 8:
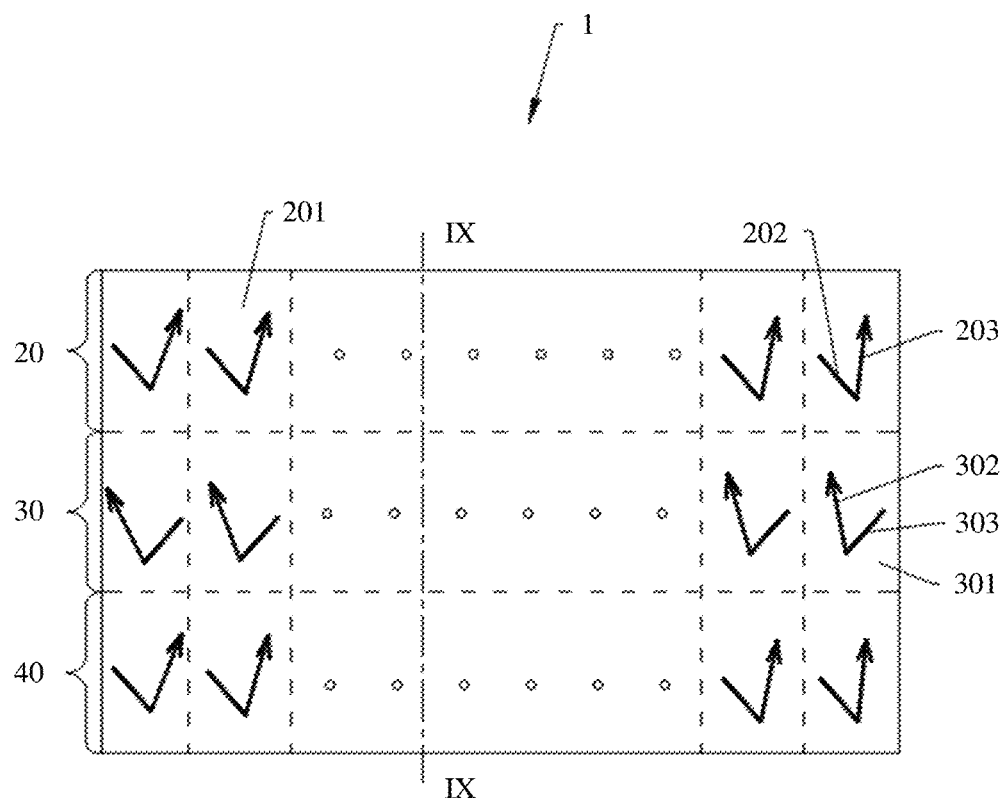
FIG. 8 is a schematic diagram of a usage status of the liquid crystal on silicon shown in FIG. 2.
Figure 9:
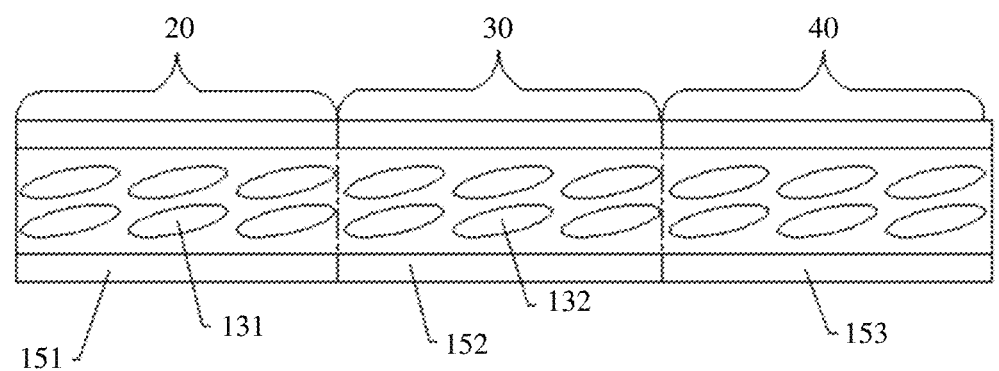
FIG. 9 is a schematic structural diagram along a line IX-IX in FIG. 8.

Referring to FIG. 3 to FIG. 5, the wavelength selective switch 100 needs to switch an output port 102 for beams of different wavelengths, and when the beams of different wavelengths are incident to a surface of the liquid crystal on silicon 1, the beams of different wavelengths occupy different areas. As shown in FIG. 4, a wavelength channel corresponding to an incident beam A1 occupies pixels in an area B1, a wavelength channel corresponding to an incident beam A2 occupies pixels in an area B2, and a wavelength channel corresponding to an incident beam A3 occupies pixels in an area B3, where wavelengths of the incident beam A1, the incident beam A2, and the incident beam A3 are different from each other. When voltage information is loaded to the drive circuit 14, voltage information of pixel areas corresponding to different wavelength channels in an Z direction (a port switching direction) is different, to form phase gratings with different phase periods in the Z direction. The phase grating is a reflective blazed grating with a 2π step change, so that diffracted light energy of a beam is concentrated in a predetermined direction, that is, concentrated in a spectral order (for example, +1 order). When detected from this direction, spectral intensity is the greatest. A phase grating of the area B1 is shown in FIG. 5, a phase grating of the area B2 is shown in FIG. 6, and a phase grating of the area B3 is shown in FIG. 7. Periods of the three phase gratings are different, and blazed angles are different. Due to a diffraction effect of a grating, gratings of different phase periods may implement different diffraction angles, so that corresponding signals are output at different ports. As shown in FIG. 4, the incident beam A1 forms a deflected beam C1 after being diffracted, the incident beam A2 forms a deflected beam C2 after being diffracted, and the incident beam A3 forms a deflected beam C3 after being diffracted. Diffraction angles of the deflected beam C1, the deflected beam C2, and the deflected beam C3 are different. A diffraction principle of the liquid crystal on silicon 1 is: it may be understood according to a grating equation $\Lambda_1$ (sin θ+sin Bm)=mλ that a diffraction angle Bm of signal light (m=+1 order) may be implemented by controlling a phase period $\Lambda_1$, where θ is an incident angle. The output port group includes N output ports 102 (N is an integer greater than or equal to 2), and diffraction angles required by deflected beams corresponding to the N output ports 102 are different. For example, a diffraction angle required by a deflected beam corresponding to an output port 102 located in a central area is relatively small, while a diffraction angle required by a deflected beam corresponding to an output port 102 located in a peripheral area is large. A more peripheral port requires a larger diffraction angle, and corresponds to a smaller phase grating period. Due to a twisted effect of the liquid crystal molecule, when a phase grating period in the Z direction is very small and a voltage gradient is very large, the liquid crystal molecule in the liquid crystal layer 13 not only is deflected in an XY plane, but also is rotated in an XZ plane (namely, a plane parallel to the first panel 11). As a result, rotation occurs in a polarization state of the deflected beam, and the deflected beam is further enabled to generate a polarization loss and an insufficient diffraction loss. This increases a loss of the wavelength selective switch 100.

Figure 10:
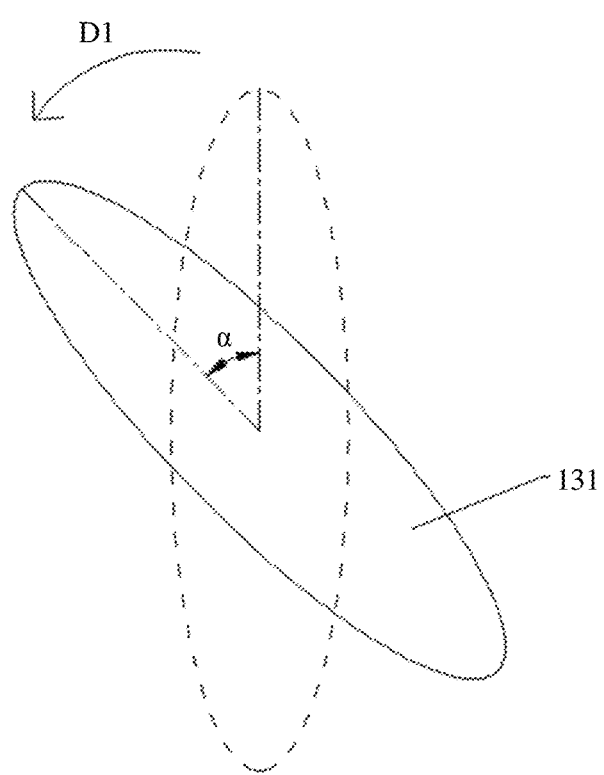
FIG. 10 is a schematic diagram of deflection when a first peripheral liquid crystal in a first liquid crystal in FIG. 9 is energized.

Referring to FIG. 8 to FIG. 11, the liquid crystal on silicon 1 has a first pixel area 20. There are a plurality of first sub-pixel areas 201 in first pixel area 20, and incident beams 202 of different wavelengths are incident to the different first sub-pixel areas 201. The liquid crystal layer 13 includes a first liquid crystal 131 located in the first pixel area 20. The first liquid crystal 131 is all liquid crystals of the liquid crystal layer 13 located in the first pixel area 20. Under control of the electric field, the first liquid crystal 131 is deflected in the plane perpendicular to the first panel 11. In this case, the liquid crystal on silicon 1 forms a plurality of first phase gratings with different phase periods in the first pixel area 20, the plurality of first phase gratings are in one-to-one correspondence with the plurality of first sub-pixel areas 201, and the plurality of first phase gratings are used to diffract the incident beams 202 of different wavelengths. In this way, the incident beams 202 of different wavelengths are deflected to form the deflected beams 203 with different diffraction and deflection directions. As shown in FIG. 10, under the control of the electric field, the first liquid crystal 131 is further deflected towards a first direction D1 in the plane parallel to the first panel 11. In this case, because phase periods and voltage gradients are different, deflection angles of different parts of the first liquid crystal 131 that are located in the different first sub-pixel areas 201 are different, but deflection directions are the same, to be specific, all the different parts are deflected towards the first direction D1. The alignment film 15 includes a first partial alignment film 151 located in the first pixel area 20. An alignment direction R1 of the first partial alignment film 151 is deflected towards a second direction D2 relative to a polarization direction P1 of the incident beam 202. The second direction D2 is opposite to the first direction D1 to reduce a loss of the deflected beam 203.

In this embodiment, the alignment direction R1 of the first partial alignment film 151 of the alignment film 15 is deflected towards the second direction D2 relative to the polarization direction P1 of the incident beam 202, and the second direction D2 is opposite to the first direction D1. Therefore, when the liquid crystal on silicon 1 is energized and when the first liquid crystal 131 is deflected towards the first direction D1 in the plane parallel to the first panel 11, the initial orientation that is brought by the alignment film 15 and that is of the first liquid crystal 131 offsets at least a part of a deflection angle of the first liquid crystal 131 in the plane parallel to the first panel 11. In this way, a deflection angle between the first liquid crystal 131 and the polarization direction of the incident beam 202 is reduced, and a rotation angle of a polarization state of the deflected beam 203 is reduced, so that a polarization loss and an insufficient diffraction loss of the deflected beam 203 are relatively low, a loss of the wavelength selective switch 100 is relatively small, and performance of the wavelength selective switch 100 is optimized.

Figure 11:
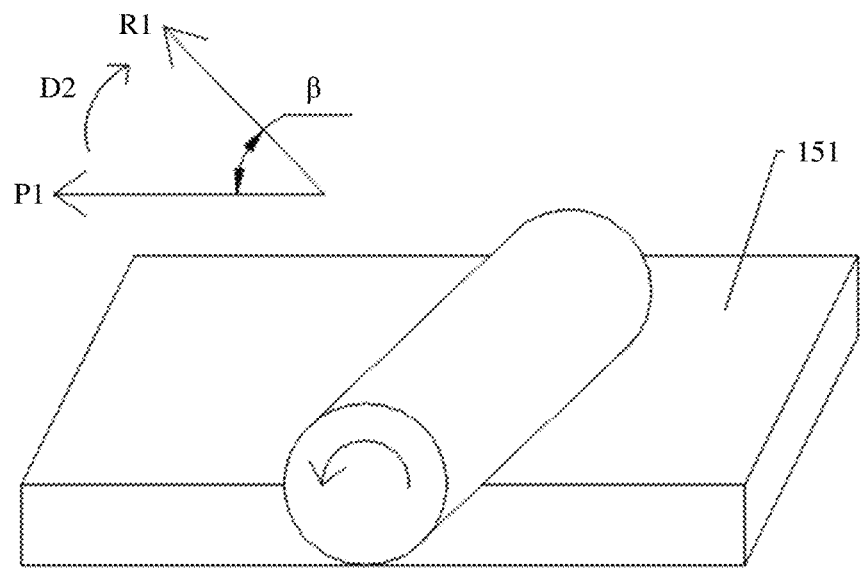
FIG. 11 is a schematic diagram of alignment of a first partial alignment film of an alignment film in FIG. 8.

It may be understood that the alignment direction of the alignment film 15 may be implemented by using an existing alignment process (for example, rubbing alignment, chemical alignment, or optical alignment), and any hardware device does not need to be added. Therefore, there is no additional cost. In addition, a preparation process of the liquid crystal on silicon 1 does not need to be changed, and only a parameter in an alignment process needs to be changed. Therefore, an alignment method has strong implementability, a low cost, and a wide application scope. The alignment direction is an orientation of a polymer molecule in the alignment film 15. The alignment direction influences the initial orientation of the liquid crystal in the liquid crystal layer 13. In an embodiment, as shown in FIG. 11, the first partial alignment film 151 of the alignment film 15 is aligned in a rubbing alignment manner. A rubbing advancing direction of a rubbing roller that uses the rubbing alignment manner is the same as the alignment direction R1 of the first partial alignment film 151, and an angle is formed between the rubbing advancing direction and the polarization direction P1 of the incident beam 202. That the second direction D2 is opposite to the first direction D1 means that deflection trends of the two directions are opposite. As shown in FIG. 10 and FIG. 11, if the first direction D1 is anti-clockwise deflection, the second direction D2 is clockwise deflection, or if the first direction D1 is clockwise deflection, the second direction D2 is anti-clockwise deflection.

Optionally, referring to FIG. 8 to FIG. 11 and FIG. 15, when a working voltage V is applied to the liquid crystal on silicon 1, the first liquid crystal 131 is deflected in a plane perpendicular to the first panel 11, and is deflected towards a first direction D1 in a plane parallel to the first panel 11, so that a plurality of first phase gratings with different phase periods are formed in the first pixel area 20. The working voltage V corresponds to phase periods of the plurality of first phase gratings. A testing liquid crystal on silicon 5 is provided, where a difference between the testing liquid crystal on silicon 5 and the liquid crystal on silicon 1 lies in that alignment directions of alignment films are different. An alignment film of the testing liquid crystal on silicon 5 is aligned along an initial direction, where the testing liquid crystal on silicon 5 has a testing liquid crystal. A testing voltage V' the same as the working voltage V is applied to the testing liquid crystal on silicon 5, so that the testing liquid crystal performs a deflection action the same as that of the first liquid crystal 131. A deflection direction of the testing liquid crystal is detected to obtain a second direction opposite to the direction. The alignment direction R1 of the first partial alignment film 151 is designed based on the second direction.

For example, the first liquid crystal 131 forms a plurality of first phase gratings under the control of the electric field, and an alignment direction obtaining method of the first partial alignment film 151 includes:

providing a testing liquid crystal on silicon 5, where an alignment film of the testing liquid crystal on silicon 5 is aligned along an initial direction;

loading a testing voltage V' to the testing liquid crystal on silicon 5 to form a testing phase grating, where the testing phase grating is the same as the first phase grating, and the testing voltage V' is the same as the working voltage V applied to the first liquid crystal of the liquid crystal on silicon;

transmitting a linearly polarized incident beam 51 to the testing liquid crystal on silicon 5, where a polarization direction of the incident beam 51 is the same as the initial direction, an input beam is adjusted by using a polarizer 53 to form an incident beam 51 in a linear polarization state, and a polarization direction of the polarizer 53 is the same as the initial direction;

detecting that a polarization direction of a deflected beam 52 diffracted by the testing liquid crystal on silicon 5 is a testing direction, where the testing direction is deflected relative to the initial direction, recording, by using a rotary analyzer 54, an angle at which +1 order diffractive light intensity is the largest, and obtaining the testing direction at the angle, where because the testing voltage V' is the same as the working voltage V, a deflection direction of the testing direction relative to the initial direction is the same as the first direction, that is, the same as a deflection direction of the first liquid crystal 131 of the liquid crystal on silicon under the electric field; and obtaining the alignment direction of the first partial alignment film 151, where a deflection direction of the alignment direction of the first partial alignment film 151 relative to the initial direction is opposite to a deflection direction of the testing direction relative to the initial direction. For example, an opposite direction of the deflection direction of the testing direction relative to the initial direction is the second direction, and the alignment direction is deflected towards the second direction relative to the initial direction.

Optionally, referring to FIG. 8 to FIG. 11, the first liquid crystal 131 forms a plurality of first phase gratings under the control of the electric field. A phase grating with a minimum phase period in the plurality of first phase gratings is a first peripheral phase grating. In the plurality of first phase gratings, a diffraction angle of the deflected beam 203 corresponding to the first peripheral phase grating is the largest, to input the deflected beam to the most peripheral output port 102. Under the electric field of the drive circuit 14, a liquid crystal for forming the first peripheral phase grating (hereinafter referred to as a first peripheral liquid crystal, which is a part of the first liquid crystal 131) is deflected by a first angle α (shown in FIG. 10) towards the first direction. A liquid crystal for forming another first phase grating other than the first peripheral phase grating (hereinafter referred to as a first non-peripheral liquid crystal, which is a part of the first liquid crystal 131) is deflected by an angle less than the first angle α towards the first direction. A second angle β (shown in FIG. 11) is formed between the alignment direction R1 of the first partial alignment film 151 and the polarization direction P1 of the incident beam 202. The second angle β is designed based on the first angle α, and the second angle β is close to the first angle α. In an embodiment, a ratio of the second angle β to the first angle α is 0.8 to 1.2. For example, the second angle β is equal to the first angle α.

In this embodiment, the second angle β is close to the first angle α. Therefore, when the liquid crystal on silicon 1 is energized and when the first liquid crystal 131 is deflected towards the first direction in the plane parallel to the first panel 11, the initial orientation that is brought by the alignment film 15 and that is used for the first peripheral liquid crystal completely or almost completely offsets a deflection angle of the first peripheral liquid crystal in the plane parallel to the first panel 11. Rotation does not occur in a polarization direction of a deflected beam 203 diffracted by the first peripheral phase grating, and consequently, generation of a polarization loss and an insufficient diffraction loss is avoided, so that a loss of the most peripheral output port 102 of the wavelength selective switch 100 is reduced. In this way, losses of output ports 102 of the wavelength selective switch 100 are balanced, an overall loss of the wavelength selective switch 100 is relatively small, and performance of the wavelength selective switch 100 is optimized.

It may be understood that, alignment directions of the first partial alignment film 151 of the alignment film 15 are the same, all angles by which the first non-peripheral liquid crystal is deflected towards the first direction are less than the first angle α. Therefore, when the liquid crystal on silicon 1 is energized and when the first liquid crystal 131 is deflected towards the first direction D1 in the plane parallel to the first panel 11, the initial orientation that is brought by the first partial alignment film 151 of the alignment film 15 and that is of the first non-peripheral liquid crystal not only offsets a deflection angle of the first non-peripheral liquid crystal in the plane parallel to the first panel 11, but also forms an angle between a liquid crystal long axis direction of the first non-peripheral liquid crystal and a deflection direction of the incident beam 202. Rotation occurs in a polarization direction of the deflected beam 203 diffracted by the another first phase grating other than the first peripheral phase grating, thereby generating a polarization loss and an insufficient diffraction loss. In addition, a polarized beam with a smaller required diffraction angle has a larger loss generated by the alignment film 15. However, a beam further has another loss (for example, a diffraction loss of the liquid crystal on silicon 1, a system coupling loss, a transmission loss of each component, or a module assembly loss) in a transmission process of the wavelength selective switch 100, and a loss of a peripheral output port 102 (corresponding to the first peripheral liquid crystal) requiring a larger diffraction angle is much larger than a loss of an intermediate output port 102 (corresponding to the first non-peripheral liquid crystal) requiring a smaller diffraction angle. Therefore, even if a beam output from the intermediate output port has a polarization loss and an insufficient diffraction loss, total losses of the beam output from the intermediate output port 102 in the wavelength selective switch 100 is also less than or substantially equal to total losses of a beam output from the peripheral output port 102 in the wavelength selective switch 100. Losses of ports of the wavelength selective switch 100 are balanced, thereby achieving optimal system performance. The liquid crystal on silicon 1 can equalize losses of beams corresponding to the output ports 102 of the wavelength selective switch 100. Therefore, this helps to design a plurality of output ports 102 of the wavelength selective switch 100. For example, the wavelength output port 102 may be 1 (input)×20 (output), 1 (input)×40 (output), or the like.

Figure 12:
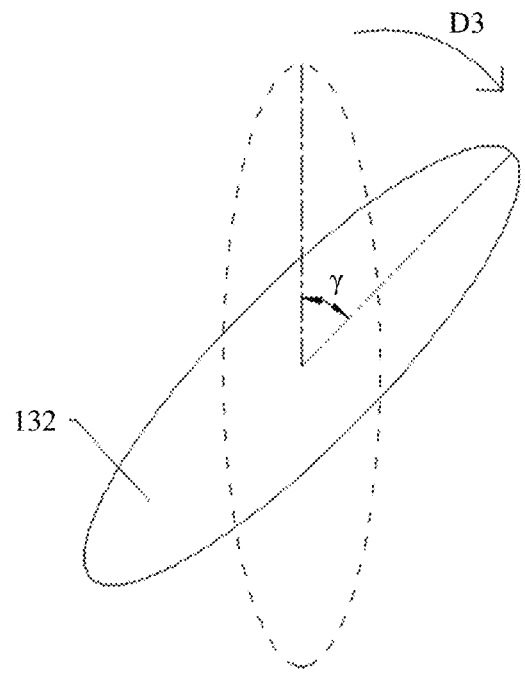
FIG. 12 is a schematic diagram of deflection when a second peripheral liquid crystal in a second liquid crystal in FIG. 9 is energized.
Figure 13:
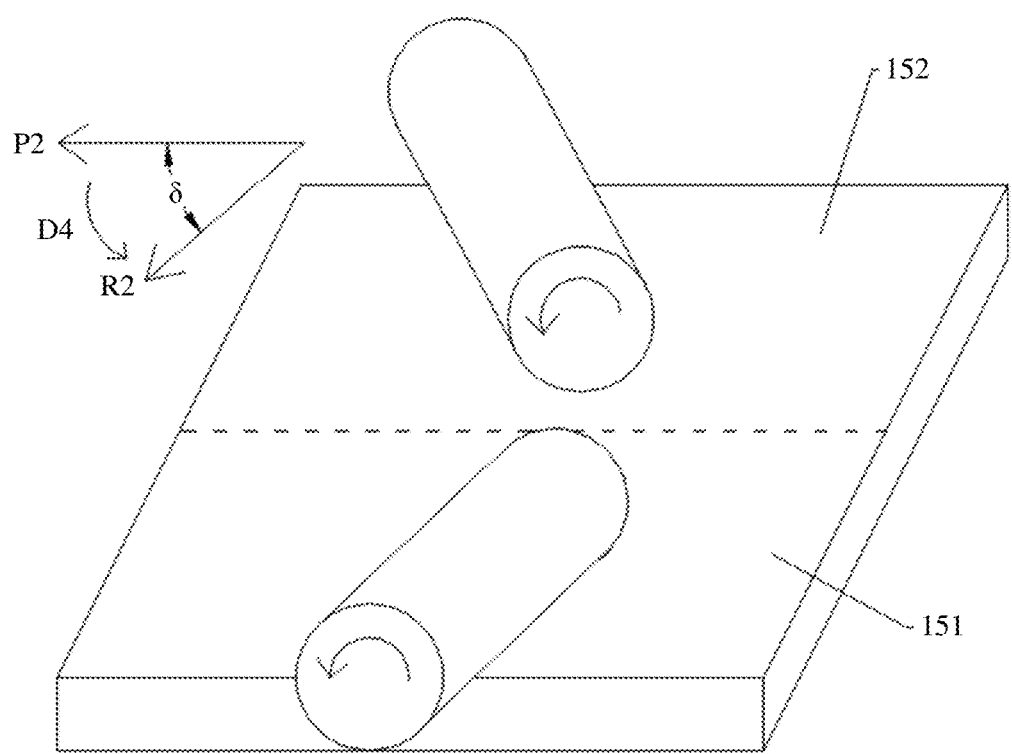
FIG. 13 is a schematic diagram of alignment of a first partial alignment film and a second partial alignment film of an alignment film in FIG. 8.

In an optional embodiment, referring to FIG. 8, FIG. 9, FIG. 12, and FIG. 13, the liquid crystal on silicon 1 further has a second pixel area 30. In this case, there are at least two input ports 101, and there are at least two output port groups, and after diffracted and deflected in the first pixel area 20 and the second pixel area 30, beams of the two input ports enter different output ports 102 of the two output port groups. There are a plurality of second sub-pixel areas 301 in the second pixel area 30, and incident beams 302 of different wavelengths are incident to the different sub-pixel areas 301. The liquid crystal layer 13 further includes a second liquid crystal 132 located in the second pixel area 30. The second liquid crystal 132 is all liquid crystals of the liquid crystal layer 13 located in the second pixel area 30. Under control of the electric field, the second liquid crystal 132 is deflected in the plane perpendicular to the first panel 11. In this case, the liquid crystal on silicon 1 forms a plurality of second phase gratings with different phase periods in the second pixel area 30, the plurality of second phase gratings are in one-to-one correspondence with the plurality of second sub-pixel areas 301, and the plurality of second phase gratings are used to diffract the incident beams 302 of different wavelengths. In this way, the incident beams 302 of different wavelengths are deflected to form the deflected beams 303 with different diffraction and deflection directions. As shown in FIG. 12, under the control of the electric field, the second liquid crystal 132 is deflected towards a third direction D3 in the plane parallel to the first panel 11. In this case, because phase periods and voltage gradients are different, deflection angles of different parts of the second liquid crystal 132 that are located in different second sub-pixel areas 301 are different, but deflection directions are the same, to be specific, the different parts are deflected towards the third direction D3. The alignment film 15 further includes a second partial alignment film 152 located in the second pixel area 30. As shown in FIG. 13, an alignment direction R2 of the second partial alignment film 152 is deflected towards a fourth direction D4 relative to a polarization direction P2 of the incident beam 302. The fourth direction D4 is opposite to the third direction D3 to reduce a loss of the deflected beam 303.

In this embodiment, the alignment direction R2 of the second partial alignment film 152 of the alignment film 15 is deflected towards the fourth direction D4 relative to the polarization direction P2 of the incident beam 302, and the fourth direction D4 is opposite to the third direction D3. Therefore, when the liquid crystal on silicon 1 is energized and when the second liquid crystal 132 is deflected towards the third direction D3 in the plane parallel to the first panel 11, the initial orientation that is brought by the alignment film 15 and that is of the second liquid crystal 132 offsets at least a part of a deflection angle of the second liquid crystal 132 in the plane parallel to the first panel 11. In this way, a deflection angle between the second liquid crystal 132 and the polarization direction P2 of the incident beam 302 is reduced, and a rotation angle of a polarization state of the deflected beam 303 is reduced, so that a polarization loss and an insufficient diffraction loss of the deflected beam 303 are relatively low, a loss of the wavelength selective switch 100 is relatively small, and performance of the wavelength selective switch 100 is optimized.

Figure 14:
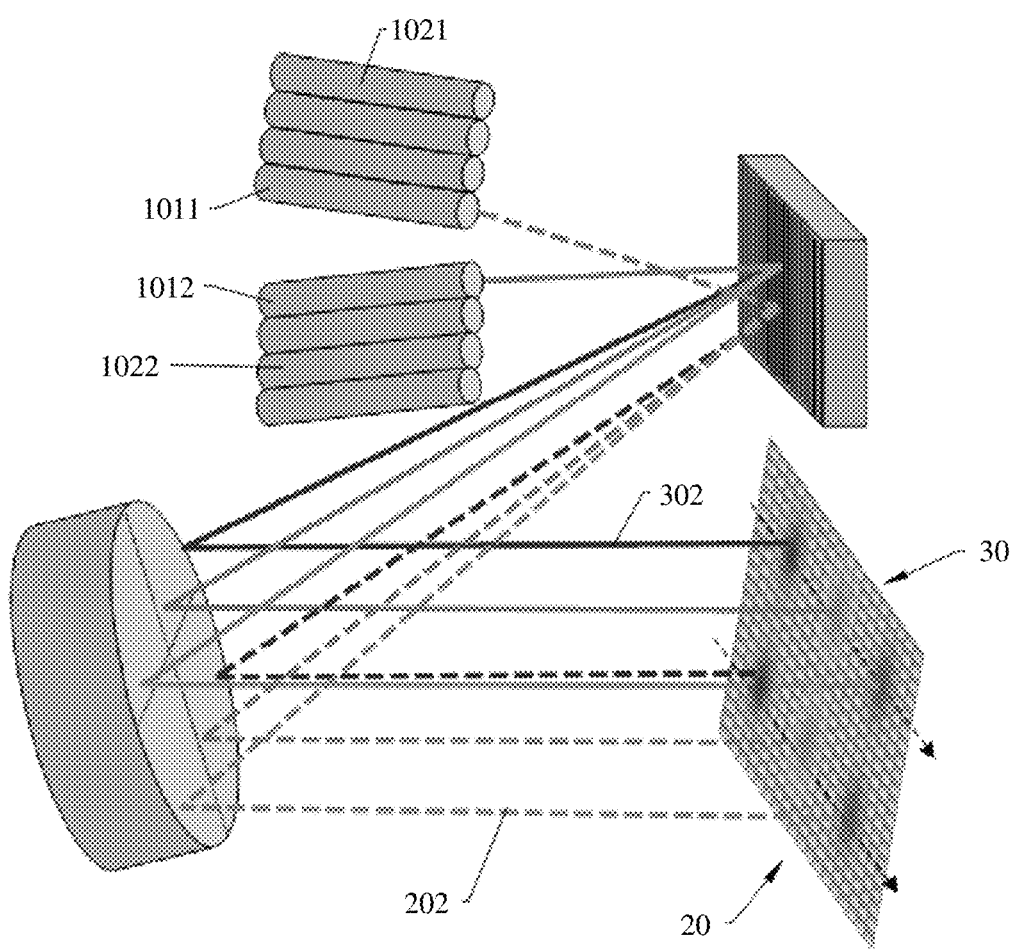
FIG. 14 is a schematic diagram of an implementation of the wavelength selective switch shown in FIG. 1.

It may be understood that, as shown in FIG. 14, the liquid crystal on silicon 1 can diffract and deflect incident beams generated from the two input ports 101 (for example, a first input port 1011 and a second input port 1012), to form two parts of deflected beams. The deflected beams are input into the two output port groups (for example, a first output port group 1021 and a second output port group 1022). A pixel area that is of the liquid crystal on silicon 1 and that is occupied by a beam from the first input port 1011 is different from a pixel area that is of the liquid crystal on silicon 1 and that is occupied by a beam from the second input port 1012.

The first partial alignment film 151 of the alignment film 15 is designed based on deflection of the first liquid crystal 131 in the first pixel area 20, and the second partial alignment film 152 is designed based on deflection of the second liquid crystal 132 in the second pixel area 30. Therefore, the first partial alignment film 151 and the second partial alignment film 152 can meet initial orientation requirements of the liquid crystals in the pixel areas thereof, and do not affect each other. In this way, the liquid crystal on silicon 1 can meet a requirement on a larger quantity of output port groups.

Optionally, referring to FIG. 8, FIG. 9, FIG. 12, and FIG. 13, the second liquid crystal 132 forms a plurality of second phase gratings under the control of the electric field. A phase grating with a minimum phase period in the plurality of second phase gratings is a second peripheral phase grating. In the plurality of second phase gratings, a diffraction angle of the deflected beam 303 corresponding to the second peripheral phase grating is the largest, to input the deflected beam to the most peripheral output port 102. Under the electric field of the drive circuit 14, a liquid crystal for forming the second peripheral phase grating (hereinafter referred to as a second peripheral liquid crystal, which is a part of the second liquid crystal 132) is deflected by a third angle γ towards the third direction D3. A liquid crystal for forming another second phase grating other than the second peripheral phase grating (hereinafter referred to as a second non-peripheral liquid crystal, which is a part of the second liquid crystal 132) is deflected by an angle less than the third angle γ towards the third direction D3. A fourth angle δ is formed between the alignment direction R2 of the second partial alignment film 152 and the polarization direction P2 of the beam. The fourth angle δ is designed based on the third angle γ, and the fourth angle δ is close to the third angle γ. In an embodiment, a ratio of the fourth angle δ to the third angle γ is 0.8 to 1.2. For example, the fourth angle δ is equal to the third angle γ.

In this embodiment, the fourth angle δ is close to the third angle γ. Therefore, when the liquid crystal on silicon 1 is energized and when the second liquid crystal 132 is deflected towards the third direction D3 in the plane parallel to the first panel 11, the initial orientation that is brought by the alignment film 15 and that is used for the second peripheral liquid crystal completely or almost completely offsets a deflection angle of the second peripheral liquid crystal in the plane parallel to the first panel 11. Rotation does not occur in a polarization direction P2 of a deflected beam 303 diffracted by the second peripheral phase grating, and consequently, generation of a polarization loss and an insufficient diffraction loss is avoided, so that a loss of the most peripheral output port 102 of the wavelength selective switch 100 is reduced. In this way, losses of output ports 102 of the wavelength selective switch 100 are balanced, an overall loss of the wavelength selective switch 100 is relatively small, and performance of the wavelength selective switch 100 is optimized.

In an embodiment, referring to FIG. 8, FIG. 10, and FIG. 12 to FIG. 14, the third direction D3 is opposite to the first direction D1. For example, a beam 202 input from the first input port 1011 performs upward diffraction and deflection on the plurality of first phase gratings generated in the first pixel area 20, to output a formed deflected beam 203 to the first output port group 1021. A beam 302 input from the second input port 1012 performs downward diffraction and deflection on the plurality of second phase gratings generated in the second pixel area 30, to output a formed deflected beam 303 to the second output port group 1022. In this embodiment, the liquid crystal on silicon 1 can meet diffraction requirements of different deflection directions.

As shown in FIG. 13, when the first partial alignment film 151 and the second partial alignment film 152 of the alignment film 15 are aligned in a rubbing alignment manner, a rubbing advancing direction of a rubbing roller that uses the rubbing alignment manner and that is on the first partial alignment film 151 is the same as the alignment direction R1 of the first partial alignment film 151, and a rubbing advancing direction of the second partial alignment film 152 is the same as the alignment direction R2 of the second partial alignment film 152.

In another embodiment, the third direction D3 is the same as the first direction D1. The second liquid crystal 132 forms a plurality of second phase gratings under the control of the electric field. A phase grating with a minimum phase period in the plurality of second phase gratings is a second peripheral phase grating, and a liquid crystal for forming the second peripheral phase grating is deflected by a third angle γ towards the third direction D3, where the third angle γ is the same as the first angle α, and the alignment direction R2 of the second partial alignment film 152 is the same as the alignment direction R1 of the first partial alignment film 151. In this embodiment, a design of the first output port group 1021 corresponding to the first pixel area 20 and a design of the second output port group 1022 corresponding to the second pixel area 30 may be the same or different. For example, when required maximum diffraction angles are the same, quantities of output ports 102 may be different. Alternatively, when required maximum diffraction angles are the same, and quantities of output ports 102 are also the same, diffraction angles required by some ports are different. It may be understood that, because the alignment direction R2 of the second partial alignment film 152 and the alignment direction R1 of the first partial alignment film 151 are the same, an alignment process of the alignment film 15 can be simplified, and an alignment cost of the alignment film 15 can be reduced.

In an optional embodiment, the liquid crystal on silicon 1 may further include a third pixel area 40, to meet diffraction and deflection requirements of a third input port and a third output port group. For a design method of a third partial alignment film 153 of an alignment film 15 corresponding to the third pixel area 40, refer to a design method of the first partial alignment film 151 and/or a design method of the second partial alignment film 152. Certainly, the liquid crystal on silicon 1 may further include more pixel areas.

Figure 15:
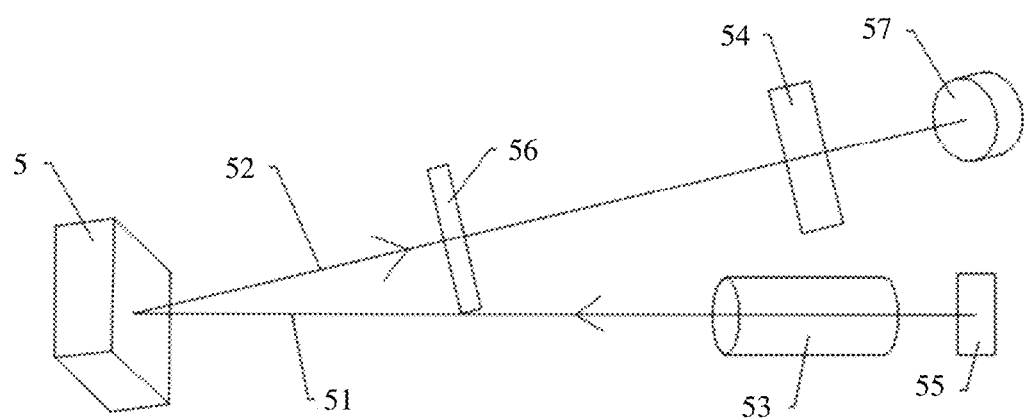
FIG. 15 is a schematic diagram of an alignment direction obtaining method according to an embodiment.

Referring to FIG. 1 and FIG. 15, this application further provides an alignment direction obtaining method, applied to an alignment film 15 of a liquid crystal on silicon 1. Alignment directions of the first partial alignment film 151, the second partial alignment film 152, and the third partial alignment film 153 of the alignment film 15 in the foregoing embodiments can be obtained by using the alignment direction obtaining method.

The alignment direction obtaining method includes the following steps.

S01: Provide a testing liquid crystal on silicon 5, where an alignment film of the testing liquid crystal on silicon 5 is aligned along an initial direction, where an example in which the testing liquid crystal on silicon 5 corresponding to a 1×40 wavelength selective switch is used, and a maximum diffraction angle required for the testing liquid crystal on silicon 5 is 4°.

S02: Load a testing voltage to the testing liquid crystal on silicon 5 to form a testing phase grating, where the testing liquid crystal on silicon 5 to which the testing voltage is loaded forms a blazed grating with a period of 6, and the blazed grating corresponds to a diffraction angle of 4°.

S03: Transmit a linearly polarized incident beam 51 to the testing liquid crystal on silicon 5, where a polarization direction of the incident beam 51 is the same as the initial direction, an input beam is adjusted by using a polarizer 53 to form an incident beam 51 in a linear polarization state, and a polarization direction of the polarizer 53 is the same as the initial direction.

S04: Detect that a polarization direction of a deflected beam 52 diffracted by the testing liquid crystal on silicon 5 is a testing direction, record, by using a rotary analyzer 54, an angle at which +1 order diffractive light intensity is the largest, and obtain the testing direction at the angle.

S05: Obtain an alignment direction of the alignment film 15 of the liquid crystal on silicon 1, where a deflection direction of the alignment direction relative to the initial direction is opposite to a deflection direction of the testing direction relative to the initial direction. For example, if the testing direction is deflected towards a first direction relative to the initial direction, the alignment direction is deflected towards a second direction relative to the initial direction, where the second direction is opposite to the first direction.

In this embodiment, in the alignment direction obtaining method, the deflection direction of the deflected beam 52 is detected to obtain the alignment direction of the alignment film 15. The obtaining method is highly efficient and highly accurate, and obtaining alignment directions corresponding to the alignment films 15 based on different diffraction and deflection requirements has high flexibility and a wide application range.

In an optional embodiment, the testing liquid crystal on silicon 5 has a phase period range with a same diffraction steering direction. For example, the testing liquid crystal on silicon 5 is used to form a plurality of phase gratings with a same diffraction steering direction, and phase periods corresponding to these phase gratings jointly form the phase period range. A phase period of the testing phase grating is a minimum value in the phase period range. According to a grating equation, a larger diffraction angle indicates a smaller phase period. Therefore, the minimum value in the phase period range corresponds to a phase grating that generates a maximum diffraction angle. The phase grating corresponding to the maximum diffraction angle is selected as the testing phase grating. In this way, the polarization direction and a deflection angle of the deflected beam 52 can be obtained more accurately, thereby helping to improve accuracy of the alignment direction obtaining method.

Optionally, a first angle is formed between the testing direction and the initial direction, a second angle is formed between the alignment direction and the initial direction, and the second angle is close to the first angle. In an embodiment, a ratio of the second angle to the first angle is 0.8 to 1.2. For example, the second angle is equal to the first angle. Because the second angle is close to the first angle, with the use of the alignment film 15 in the alignment direction, the liquid crystal of the liquid crystal on silicon 1 can have a better initial orientation, to offset a deflection angle of the liquid crystal in the plane parallel to the first panel 11. In this way, rotation does not occur in a polarization direction of the deflected beam 52 with a maximum diffraction angle, and generation of a polarization loss and an insufficient diffraction loss is avoided, so that a loss of the output port 102 at the most peripheral of the wavelength selective switch 100 is reduced. In this way, losses of output ports 102 of the wavelength selective switch 100 are balanced, an overall loss of the wavelength selective switch 100 is relatively small, and performance of the wavelength selective switch 100 is optimized.

In the alignment direction obtaining method, a collimating lens 55, a spherical lens 56, and a space detector 57 may be used to perform auxiliary testing, to obtain a more accurate alignment direction.

Referring to FIG. 1 to FIG. 15, an embodiment further provides a method for manufacturing a liquid crystal on silicon. The method for manufacturing a liquid crystal on silicon may be used to manufacture the liquid crystal on silicon 1 in the foregoing embodiment. The liquid crystal on silicon 1 is used to diffract an incident beam in a linear polarization state to form a deflected beam. The method for manufacturing a liquid crystal on silicon includes:

providing a first panel 11, coating a first layer of alignment film on the first panel 11, and aligning the first layer of alignment film, so that an alignment direction of the first layer of alignment film is deflected towards a second direction relative to a polarization direction of the incident beam;

providing a second panel 12, coating a second layer of alignment film on the second panel 12, and aligning the second layer of alignment film, where an alignment direction of the second layer of alignment film is the same as the alignment direction of the first layer of alignment film; and laminating the first panel 11 and the second panel 12, and filling a liquid crystal layer 13 between the first panel 11 and the second panel 12 to form the liquid crystal on silicon 1, where a circuit on the first panel 11 and a circuit on the second panel 12 jointly form a drive circuit 14, under an electric field generated by the drive circuit 14, a liquid crystal in the liquid crystal layer 13 is deflected in a plane perpendicular to the first panel 11, and is deflected towards a first direction in a plane parallel to the first panel 11, and the first direction is opposite to the second direction.

In this embodiment, the alignment directions of the first layer of alignment film and the second layer of alignment film are deflected towards the second direction relative to the polarization direction of the incident beam, and the second direction is opposite to the first direction. Therefore, when the liquid crystal on silicon 1 is energized and when the liquid crystal in the liquid crystal layer 13 is deflected towards the first direction in the plane parallel to the first panel 11, initial orientations that are brought by the first layer of alignment film and the second layer of alignment film and that are of the liquid crystal in the liquid crystal layer 13 offset at least a part of a deflection angle of the liquid crystal in the plane parallel to the first panel 11. In this way, a deflection angle between the liquid crystal in the liquid crystal layer 13 and the polarization direction of the incident beam is reduced, and a rotation angle of a primary polarization state of the deflected beam is reduced, so that a polarization loss and an insufficient diffraction loss of the deflected beam are relatively low, a loss of the wavelength selective switch is relatively small, and performance of the wavelength selective switch is optimized.

The liquid crystal layer 13 may be filled after the first panel 11 and the second panel 12 are laminated. Alternatively, a liquid crystal filling area may be defined on the first panel 12 by using a plastic frame, and then the first panel 11 and the second panel 12 are laminated after a liquid crystal is filled in the liquid crystal filling area to form the liquid crystal layer 13.

In an optional embodiment, referring to FIG. 15, an alignment direction obtaining method of the first layer of alignment film includes:

providing a testing liquid crystal on silicon 5, where an alignment film of the testing liquid crystal on silicon 5 is aligned along an initial direction;

loading a testing voltage to the testing liquid crystal on silicon 5 to form a testing phase grating, where the testing phase grating is the same as a phase grating that needs to be generated by the liquid crystal on silicon;

transmitting a linearly polarized incident beam 51 to the testing liquid crystal on silicon 5, where a polarization direction of the incident beam 51 is the same as the initial direction;

detecting that a polarization direction of a deflected beam 52 diffracted by the testing liquid crystal on silicon 5 is a testing direction; and obtaining the alignment direction of the first layer of alignment film, where a deflection direction of the alignment direction of the first layer of alignment film relative to the initial direction is opposite to a deflection direction of the testing direction relative to the initial direction.

In this embodiment, the deflection direction of the deflected beam 52 is detected to obtain the alignment direction of the first layer of alignment film. The obtaining method is highly efficient and highly accurate, and obtaining alignment directions corresponding to the alignment films based on different diffraction and deflection requirements has high flexibility and a wide application range.

The testing liquid crystal on silicon has a plurality of phase gratings with a same diffraction steering direction, phase periods of the plurality of phase gratings form a phase period range, and a phase period of the testing phase grating is a minimum value in the phase period range. According to a grating equation, a larger diffraction angle indicates a smaller phase period. Therefore, the minimum value in the phase period range corresponds to a phase grating that generates a maximum diffraction angle. A phase grating corresponding to the maximum diffraction angle is selected as the testing phase grating. In this way, the polarization direction and a deflection angle of the deflected beam can be obtained more accurately, thereby helping to improve accuracy of the alignment direction obtaining method.

A first angle is formed between the testing direction and the initial direction, a second angle is formed between the alignment direction and the initial direction, and a ratio of the second angle to the first angle is 0.8 to 1.2. For example, the second angle is equal to the first angle. Because the second angle is close to the first angle, with the use of the first layer of alignment film and the second layer of alignment film in the alignment direction, the liquid crystal of the liquid crystal on silicon 1 can have a better initial orientation, to offset a deflection angle of the liquid crystal in the plane parallel to the first panel 11. In this way, rotation does not occur in a polarization direction of the deflected beam with a maximum diffraction angle, and generation of a polarization loss and an insufficient diffraction loss is avoided, so that a loss of the output port at the most peripheral of the wavelength selective switch is reduced. In this way, losses of output ports of the wavelength selective switch are balanced, an overall loss of the wavelength selective switch is relatively small, and performance of the wavelength selective switch is optimized.

The foregoing descriptions are merely implementations of embodiments, but are not intended to limit the protection scope of this application. Any variation or replacement readily figured out by a person of ordinary skill in the art within the technical scope disclosed in this application shall fall within the protection scope of this application.

What is claimed is:

1. A liquid crystal on silicon, applied to a wavelength selective switch, wherein the liquid crystal on silicon is used to diffract an incident beam in a linear polarization state to form a deflected beam, the liquid crystal on silicon comprising:
   a first panel and a second panel, the first panel and second panel oppositely disposed;
   a liquid crystal layer located between the first panel and the second panel;
   a drive circuit configured to generate an electric field to control deflection of a liquid crystal in the liquid crystal layer; and
   two layers of alignment films, the two layers of alignment films located on two opposite sides of the liquid crystal layer, wherein
   the liquid crystal on silicon has a first pixel area, the liquid crystal layer comprises a first liquid crystal located in the first pixel area, under control of the electric field, the first liquid crystal is deflected in a plane perpendicular to the first panel, and is deflected towards a first direction in a plane parallel to the first panel, and the alignment film comprises a first partial alignment film located in the first pixel area, wherein an alignment direction of the first partial alignment film is deflected towards a second direction relative to a polarization direction of the incident beam, and the second direction is opposite to the first direction to reduce a loss of the deflected beam.

2. The liquid crystal on silicon according to claim 1, wherein the first liquid crystal forms a plurality of first phase gratings under control of the electric field, a phase grating with a minimum phase period in the plurality of first phase gratings is a first peripheral phase grating, and a liquid crystal for forming the first peripheral phase grating is deflected by a first angle towards the first direction;
   a second angle is formed between the alignment direction of the first partial alignment film and the polarization direction of the incident beam; and
   a ratio of the second angle to the first angle is 0.8 to 1.2.

3. The liquid crystal on silicon according to claim 1, wherein the liquid crystal on silicon further has a second pixel area, the liquid crystal layer further comprises a second liquid crystal located in the second pixel area, and under control of the electric field, the second liquid crystal is deflected in the plane perpendicular to the first panel, and is deflected towards a third direction in the plane parallel to the first panel; and
   the alignment film further comprises a second partial alignment film located in the second pixel area, wherein an alignment direction of the second partial alignment film is deflected towards a fourth direction relative to the polarization direction of the incident beam, and the fourth direction is opposite to the third direction to reduce the loss of the deflected beam.

4. The liquid crystal on silicon according to claim 2, wherein the liquid crystal on silicon further has a second pixel area, the liquid crystal layer further comprises a second liquid crystal located in the second pixel area, and under of the electric field, the second liquid crystal is deflected in the plane perpendicular to the first panel, and is deflected towards a third direction in the plane parallel to the first panel; and
   the alignment film further comprises a second partial alignment film located in the second pixel area, wherein an alignment direction of the second partial alignment film is deflected towards a fourth direction relative to the polarization direction of the incident beam, and the fourth direction is opposite to the third direction to reduce the loss of the deflected beam.

5. The liquid crystal on silicon according to claim 3, wherein the second liquid crystal forms a plurality of second phase gratings under control of the electric field, a phase grating with a minimum phase period in the plurality of second phase gratings is a second peripheral phase grating, and a liquid crystal for forming the second peripheral phase grating is deflected by a third angle towards the third direction;
   a fourth angle is formed between the alignment direction of the second partial alignment film and the polarization direction of the incident beam; and
   a ratio of the fourth angle to the third angle is 0.8 to 1.2.

6. The liquid crystal on silicon according to claim 4, wherein the second liquid crystal forms a plurality of second phase gratings under control of the electric field, a phase grating with a minimum phase period in the plurality of second phase gratings is a second peripheral phase grating, and a liquid crystal for forming the second peripheral phase grating is deflected by a third angle towards the third direction;
   a fourth angle is formed between the alignment direction of the second partial alignment film and the polarization direction of the incident beam; and
   a ratio of the fourth angle to the third angle is 0.8 to 1.2.

7. The liquid crystal on silicon according to claim 3, wherein the third direction is opposite to the first direction.

8. The liquid crystal on silicon according to claim 4, wherein the third direction is opposite to the first direction.

9. The liquid crystal on silicon according to claim 5, wherein the third direction is opposite to the first direction.

10. The liquid crystal on silicon according to claim 6, wherein the third direction is opposite to the first direction.

11. The liquid crystal on silicon according to claim 3, wherein the third direction is the same as the first direction, the second liquid crystal forms a plurality of second phase gratings under the control of the electric field, a phase grating with a minimum phase period in the plurality of second phase gratings is a second peripheral phase grating, and a liquid crystal for forming the second peripheral phase grating is deflected by a third angle towards the third direction, wherein the third angle is the same as the first angle, and the alignment direction of the second partial alignment film is the same as the alignment direction of the first partial alignment film.

12. The liquid crystal on silicon according to claim 1, wherein the first liquid crystal forms the plurality of first phase gratings under control of the electric field, and an alignment direction of the first partial alignment film is obtained by:
   providing a testing liquid crystal on silicon, wherein an alignment film of the testing liquid crystal on silicon is aligned along an initial direction;

loading a testing voltage to the testing liquid crystal on silicon to form a testing phase grating, wherein the testing phase grating is the same as the first phase grating;

transmitting a linearly polarized incident beam to the testing liquid crystal on silicon, wherein a polarization direction of the incident beam is the same as the initial direction;

detecting that a polarization direction of a deflected beam diffracted by the testing liquid crystal on silicon is a testing direction; and obtaining the alignment direction of the first partial alignment film, wherein a deflection direction of the alignment direction of the first partial alignment film relative to the initial direction is opposite to a deflection direction of the testing direction relative to the initial direction.

13. An alignment direction obtaining method, applied to an alignment film of a liquid crystal on silicon, comprising:

providing a testing liquid crystal on silicon, wherein an alignment film of the testing liquid crystal on silicon is aligned along an initial direction;

loading a testing voltage to the testing liquid crystal on silicon to form a testing phase grating;

transmitting a linearly polarized incident beam to the testing liquid crystal on silicon, wherein a polarization direction of the incident beam is the same as the initial direction;

detecting that a polarization direction of a deflected beam diffracted by the testing liquid crystal on silicon is a testing direction; and obtaining an alignment direction of the alignment film of the liquid crystal on silicon, wherein a deflection direction of the alignment direction relative to the initial direction is opposite to a deflection direction of the testing direction relative to the initial direction.

14. The alignment direction obtaining method according to claim 13, wherein the testing liquid crystal on silicon has a plurality of phase gratings with a same diffraction steering direction, phase periods of the plurality of phase gratings form a phase period range, and a phase period of the testing phase grating is a minimum value in the phase period range.

15. The alignment direction obtaining method according to claim 13, wherein a first angle is formed between the testing direction and the initial direction, a second angle is formed between the alignment direction and the initial direction, and a ratio of the second angle to the first angle is 0.8 to 1.2.

16. A method for manufacturing a liquid crystal on silicon, the liquid crystal on silicon used to diffract an incident beam in a linear polarization state to form a deflected beam, the method comprising:

providing a first panel, coating a first layer of alignment film on the first panel, and aligning the first layer of alignment film, so that an alignment direction of the first layer of alignment film is deflected towards a second direction relative to a polarization direction of the incident beam;

providing a second panel, coating a second layer of alignment film on the second panel, and aligning the second layer of alignment film, wherein an alignment direction of the second layer of alignment film is the same as the alignment direction of the first layer of alignment film; and laminating the first panel and the second panel, and filling a liquid crystal layer between the first panel and the second panel to form the liquid crystal on silicon, wherein a circuit on the first panel and a circuit on the second panel jointly form a drive circuit, under an electric field generated by the drive circuit, a liquid crystal in the liquid crystal layer is deflected in a plane perpendicular to the first panel, and is deflected towards a first direction in a plane parallel to the first panel, and the first direction is opposite to the second direction.

17. The method for manufacturing a liquid crystal on silicon according to claim 16, further including an alignment direction obtaining method of the first layer of alignment film that includes:

providing a testing liquid crystal on silicon, wherein an alignment film of the testing liquid crystal on silicon is aligned along an initial direction;

loading a testing voltage to the testing liquid crystal on silicon to form a testing phase grating;

transmitting a linearly polarized incident beam to the testing liquid crystal on silicon, wherein a polarization direction of the incident beam is the same as the initial direction;

detecting that a polarization direction of a deflected beam diffracted by the testing liquid crystal on silicon is a testing direction; and obtaining the alignment direction of the first layer of alignment film, wherein a deflection direction of the alignment direction of the first layer of alignment film relative to the initial direction is opposite to a deflection direction of the testing direction relative to the initial direction.

18. The method for manufacturing a liquid crystal on silicon according to claim 16, wherein the testing liquid crystal on silicon has a plurality of phase gratings with a same diffraction steering direction, phase periods of the plurality of phase gratings form a phase period range, and a phase period of the testing phase grating is a minimum value in the phase period range.

19. The method for manufacturing a liquid crystal on silicon according to claim 16, wherein a first angle is formed between the testing direction and the initial direction, a second angle is formed between the alignment direction and the initial direction, and a ratio of the second angle to the first angle is 0.8 to 1.2.

* * * * *